United States Patent [19]

Daguet et al.

[11] 3,801,913

[45] Apr. 2, 1974

[54] NUMERICAL FILTER AND DIGITAL DATA TRANSMISSION SYSTEM INCLUDING SAID FILTER

[75] Inventors: Jacques Lucien Daguet, Saint-Maur; Maurice Georges Bellanger, Antony, both of France

[73] Assignee: Telecommunications Radioelectriques Et Telephoniques, T.R.T., Paris, France

[22] Filed: Apr. 6, 1972

[21] Appl. No.: 241,661

[30] Foreign Application Priority Data

Apr. 8, 1971 France .............................. 71.12498

[52] U.S. Cl. ............................... 325/38 R, 235/152

[51] Int. Cl. .............................................. H03k 5/18

[58] Field of Search ................... 324/39, 40, 41, 42; 178/66 R, 67, 68; 307/233, 271; 328/60, 61, 105, 109, 110, 138, 139, 140, 141, 167; 333/70 R, 70 A, 707; 235/152

[56] References Cited

UNITED STATES PATENTS

| | | | |
|---|---|---|---|
| 3,458,815 | 7/1969 | Becker | 325/42 X |
| 3,611,143 | 10/1971 | Van Gerwen | 325/42 |
| 3,649,922 | 3/1972 | Ralph et al. | 333/70 R |
| 3,681,701 | 8/1972 | Maier | 333/70 A |

*Primary Examiner*—Benedict V. Safourek
*Attorney, Agent, or Firm*—Frank R. Trifari

[57] ABSTRACT

The invention relates to a digital filter which can be programmed, and a digital data transmission system employing automatic equalization of the transmission channel, said transmission system being adapted in such a manner that said digital filter can be used for the filter functions of transmitter and receiver.

2 Claims, 29 Drawing Figures

| D | 0 | fm 2fm | 4fm | 6fm | 8fm |
|---|---|---|---|---|---|
| $\varphi 1(t)$ | $s(t)$ | $s(t)\cos\frac{2\pi t}{T}$ | $s(t)\cos\frac{4\pi t}{T}$ | $(t)\cos\frac{6\pi t}{T}$ | $s(t)\cos\frac{8\pi t}{T}$ |
| $\varphi 2(t)$ | $s(t)$ | $s(t)\cos\left[\frac{2\pi t}{T}+\frac{\pi}{2}\right]$ | $s(t)\cos\left[\frac{4\pi t}{T}+\pi\right]$ | $s(t)\cos\left[\frac{6\pi t}{T}+\frac{3\pi}{2}\right]$ | $s(t)\cos\left[\frac{8\pi t}{T}+2\pi\right]$ |
| $\varphi 3(t)$ | $s(t)$ | $s(t)\cos\left[\frac{2\pi t}{T}+\pi\right]$ | $s(t)\cos\left[\frac{4\pi t}{T}+2\pi\right]$ | $s(t)\cos\left[\frac{6\pi t}{T}+3\pi\right]$ | $s(t)\cos\left[\frac{8\pi t}{T}+4\pi\right]$ |
| $\varphi 4(t)$ | $s(t)$ | $s(t)\cos\left[\frac{2\pi t}{T}+\frac{3\pi}{2}\right]$ | $s(t)\cos\left[\frac{4\pi t}{T}+3\pi\right]$ | $s(t)\cos\left[\frac{6\pi t}{T}+\frac{9\pi}{2}\right]$ | $s(t)\cos\left[\frac{8\pi t}{T}+6\pi\right]$ |
| $\varphi 5(t)$ | $\sigma(t)$ | $\sigma(t)\cos\left[\frac{2\pi t}{T}+\frac{\pi}{2}\right]$ | $\sigma(t)\cos\left[\frac{4\pi t}{T}+\pi\right]$ | $\sigma(t)\cos\left[\frac{6\pi t}{T}+\frac{3\pi}{2}\right]$ | $\sigma(t)\cos\left[\frac{8\pi t}{T}+2\pi\right]$ |
| $\varphi 6(t)$ | $s(t) + \sigma(t)$ | $s(t)\cos\frac{2\pi t}{T} + (t)\sin\frac{2\pi t}{T}$ | $s(t)\cos\frac{4\pi t}{T} - \sigma(t)\cos\frac{4\pi t}{T}$ | $s(t)\cos\frac{6\pi t}{T} - \sigma(t)\sin\frac{6\pi t}{T}$ | $s(t)\cos\frac{8\pi t}{T} + \sigma(t)\cos\frac{8\pi t}{T}$ |

Fig. 26

NUMERICAL FILTER AND DIGITAL DATA TRANSMISSION SYSTEM INCLUDING SAID FILTER

It is known that transmission systems to which a given frequency band is allotted in the transmission channel necessitate filters in the transmitter so as to suppress the components of the signals located beyond the allotted band. Likewise the signal which is applied to the demodulator must be heavily filtered in the receiver. Filters are also required in the receiver for the equilizer of the transmission channel which has for its object to compensate for the amplitude and delay distortions caused by the transmission channel. Filters, either separated or combined, are then used on the one hand for selecting pilot signals which are transmitted for the equalization and which serve to give a measure of the distortions in the receiver, and on the other hand they are used to be placed in the path of the received signal such that the distortions of the transmission channel are compensated for.

Hence heavy, fixed or variable filters ar required for all these different functions.

An object of the invention is to provide firstly a digital filter which can be used for all these functions in a data transmission system such that this filter can be adapted to the desired transfer function by grouping filter cells of the same type which can be integrated on a large scale and by a simple numerical control of these cells.

According to the invention the digital filter to whose input there are applied samples of an analog signal whose spectrum is restricted to a frequency $f_m$ which is half the sampling frequency is characterized in that the filter includes $2^n - 1$ elementary half-bandpass filter cells of the same type which are grouped in $n$ cascade-arranged stages, the $P^{th}$ stage including $2^{n-p}$ cells wherein $p$ varies from 1 to $n$ from the first to the last stage, while the incoming series of samples of frequency $2f_m$ is split up into $2^{n-1}$ interlaced series of frequency $2f_m/2^{n-1}$, which series are separately applied to the $2^{n-1}$ cells of the first stage, while the outgoing series of the cells of the first stage are combined pairwise so as to constitute $2^{n-2}$ series of regularly distributed samples of frequency $2f_m/2^{n-2}$ which are applied to the $2^{n-2}$ cells of the second stage, while similarly the $2^{n-p}$ outgoing series of the $p^{th}$ stage are combined pairwise so as to constitute $2^{n-(p+1)}$ series of regularly distributed samples of frequency $2f_m/2^{n-(p+1)}$ which are applied to the $2^{n-(p+1)}$ cells of the $(p+1)^{th}$ stage, the cell of the last stage providing the series of outgoing samples of the filter at a frequency of $2f_m$, while the clock signals which control the operation of the cells have a suitably chosen frequency and phase at which these cells operate as halfbandpass filters for the frequency of the samples applied thereto, each cell being provided on the one hand with means for reversing the sign of one of every two incoming and outgoing samples and on the other hand means for inhibiting its filter function, each stage being provided with a terminal for controlling the sign reversal of all cells of the stage and with a terminal for controlling the inhibition of the filter function of all cells of the stage, while the filter passband is variable in width and position in steps having a bandwidth of $f_m/2^n$ dependent on the value of the binary signals which are applied to the $n$ terminals for controlling the sign reversal and the $n$ terminals for controlling the inhibition.

A very favorable embodiment of the filter according to the invention is obtained if a suitable combination of two filters of a type described in French Patent Application filed in the name of the Applicant under No. 6,926,970 (PHN 4592) is used as an elementary filter cell.

Furthermore the invention provides a transmission system in which substantially all operations are performed by digital processes and which is designed to completely utilize the advantages of the above-mentioned filter.

The invention particularly provides a digital arrangement for quadrature modulating a data signal on orthogonal carriers which arrangement is particularly suitable for use of the programmable filter in the transmission system. This arrangement is a numerical embodiment of the quadrature modulation of orthogonal carriers which is described in French Patent Specifications No. 1,330,777 (PH 17824) and No. 1,381,314 (PH 18739) filed in the name of the Applicant on May 7, 1962 and Aug. 23, 1963, respectively.

Furthermore the invention provides a very efficient arrangement for automatically equalizing the transmission channel which is provided with a circuit for coarse equalization and a circuit for fine equalization which circuits are adjusted prior to the transmission of the signal, the circuit for fine equalization being permanently adjusted during transmission; in addition a permanent equalization check is performed in such a manner than when the distortions exceed predetermined limits, the transmission speed can be reduced so as to bring the distortions within the said limits, the modifications to be introduced into the transmission system consisting particularly of a simple variation of the filter program.

In order that the invention may be readily carried into effect, some embodiments thereof will now be described in detail by way of example with reference to the accompanying diagrammatic drawings in which:

FIGS. 1 to 9 relate to the digital fil-ter according to the invention.

FIG. 1 shows the characteristics of an elementary filter cell.

FIGS. *2a*, *2b*, *2c* represent the structure of halfbandpass filters, quarter bandpass filters and ⅛-bandpass filters.

FIGS. 10 to 14 inclusive relate to the transmitter in a transmission system according to the invention.

Figure 10:
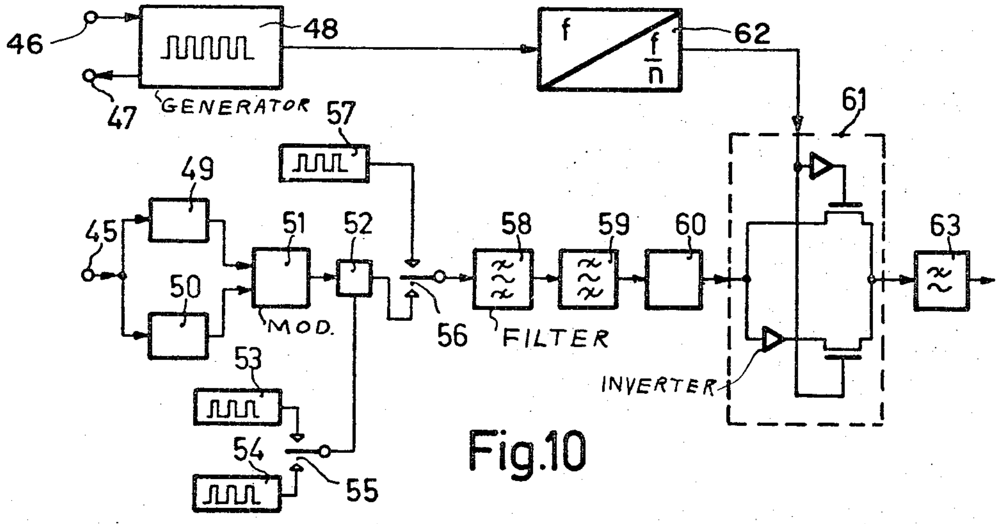

FIG. 10 shows the block diagram of the transmitter.

Figure 11:
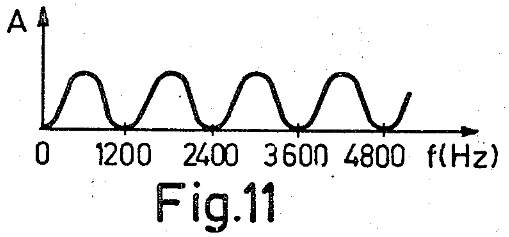

FIG. 11 shows the spectrum of the second-order bipolar signal used in the transmitter.

Figure 12:
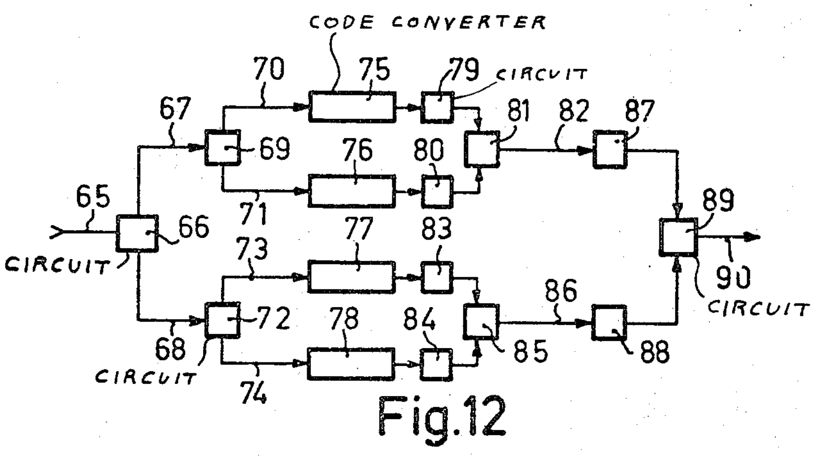
Figure 13:
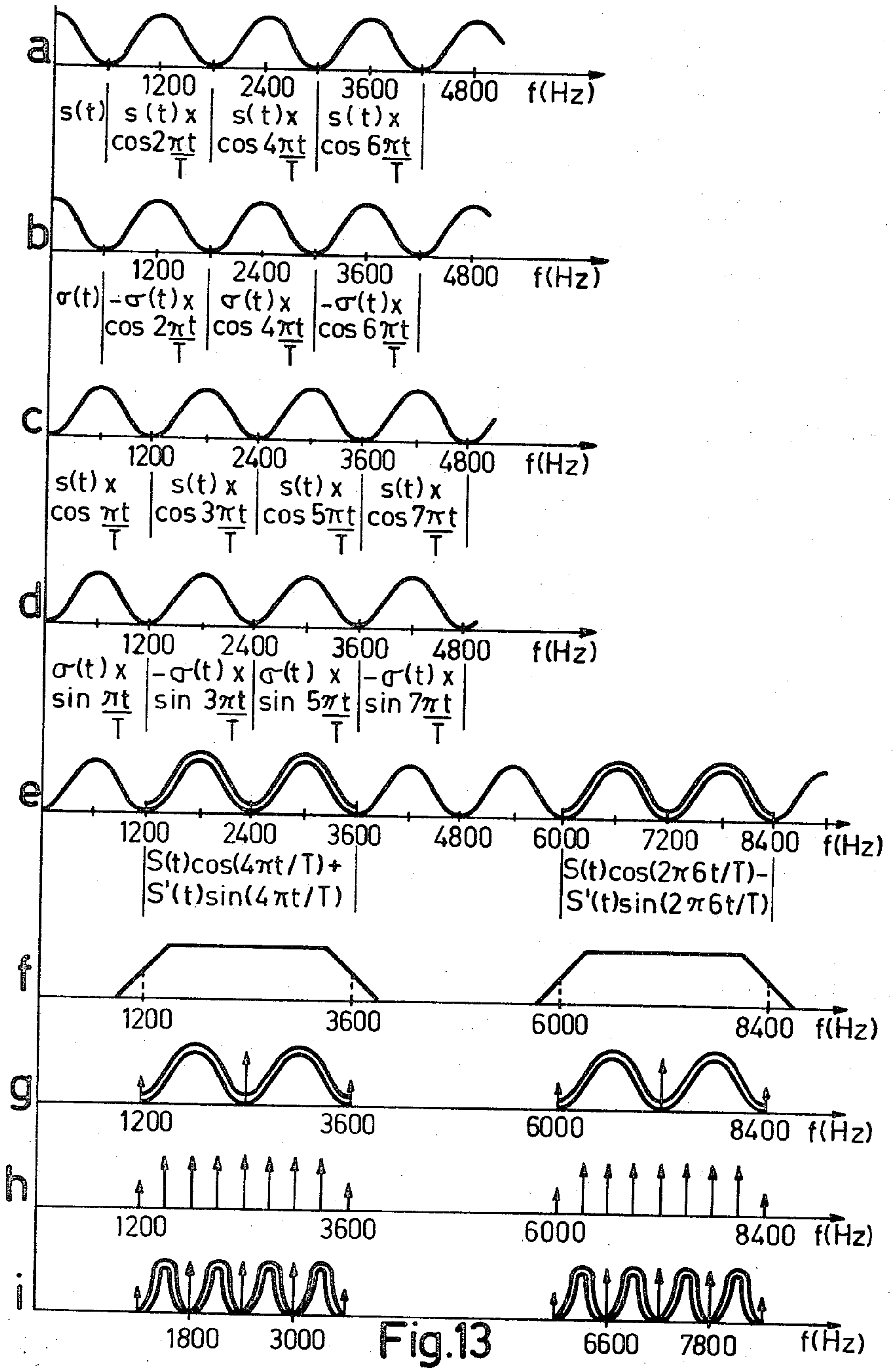

FIG. 12 is a diagrammatical representation of the operations for modulating the signal and FIG. 13 shows the spectra of the corresponding signals.

Figure 14:
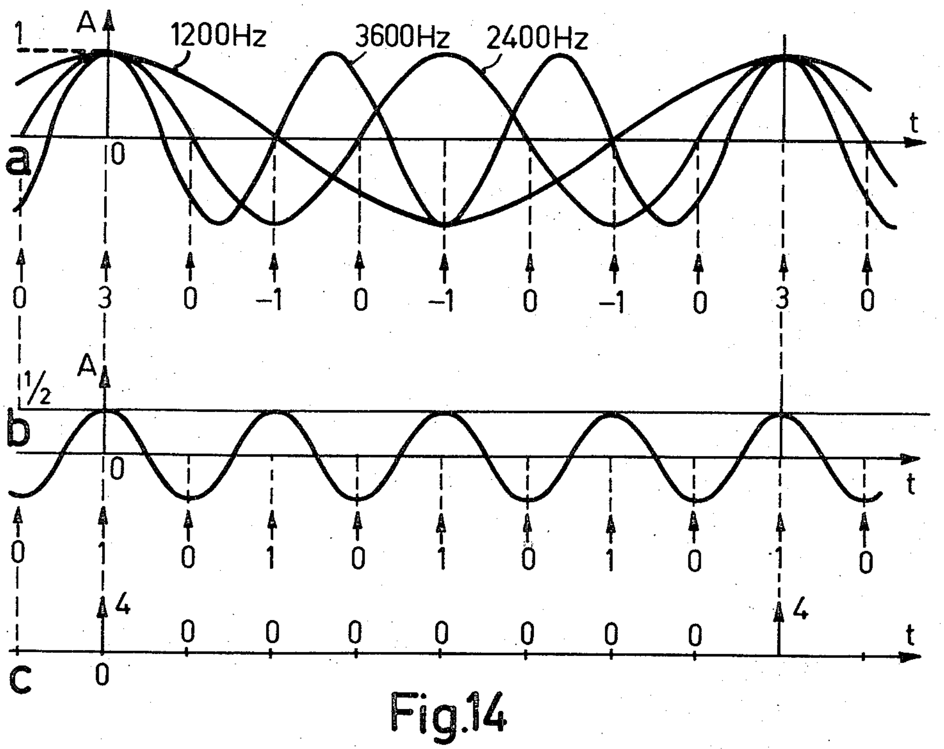

FIG. 14 shows the pilot signals.

FIGS. 15 to 25 inclusive relate to the receiver in the transmission system according to the invention.

Figure 15:
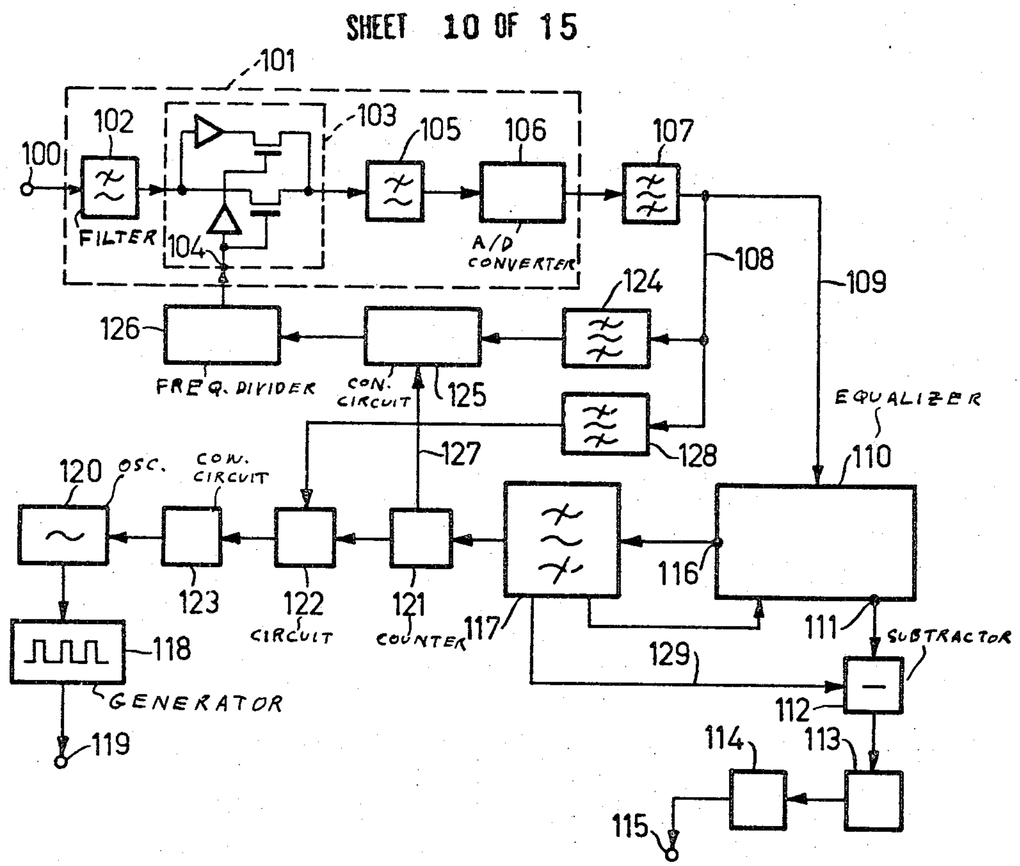

FIG. 15 is a block diagram of the receiver.

Figure 16:
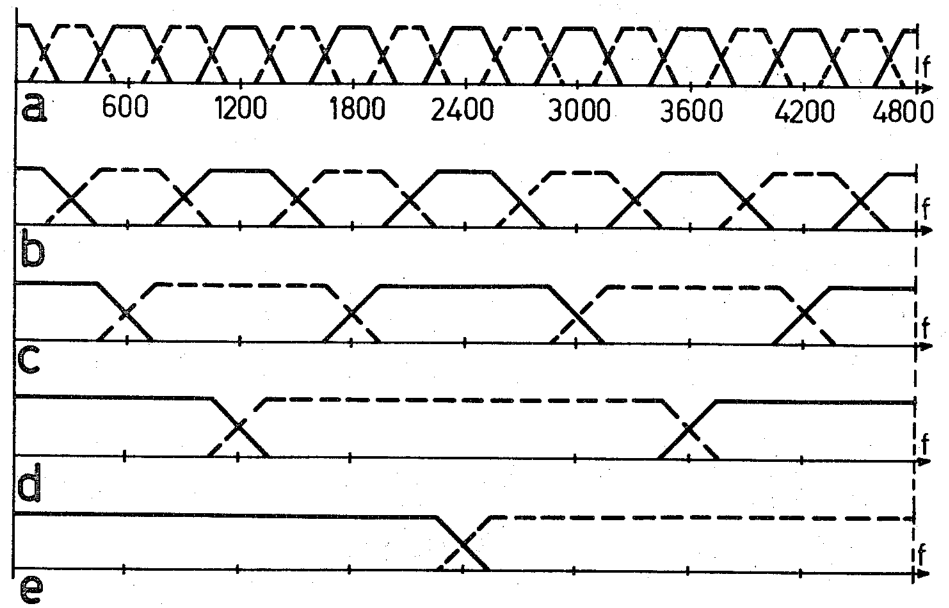

FIG. 16 shows the characteristics of the filter used in the receiver for selecting given lines from the frequency spectrum.

Figure 17:
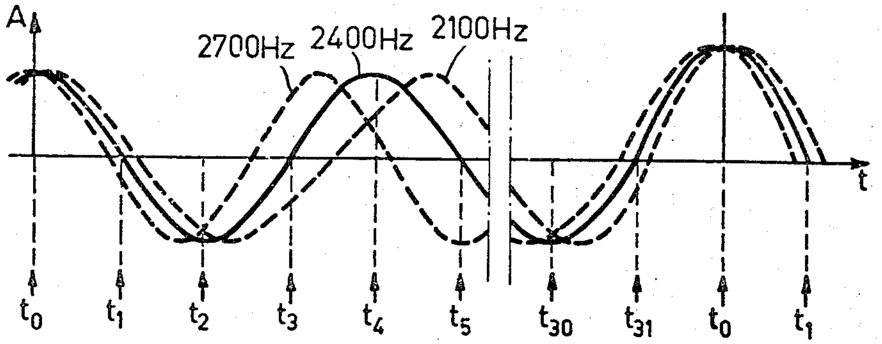

FIG. 17 shows the signals which are used for locking the receiver.

Figure 18:
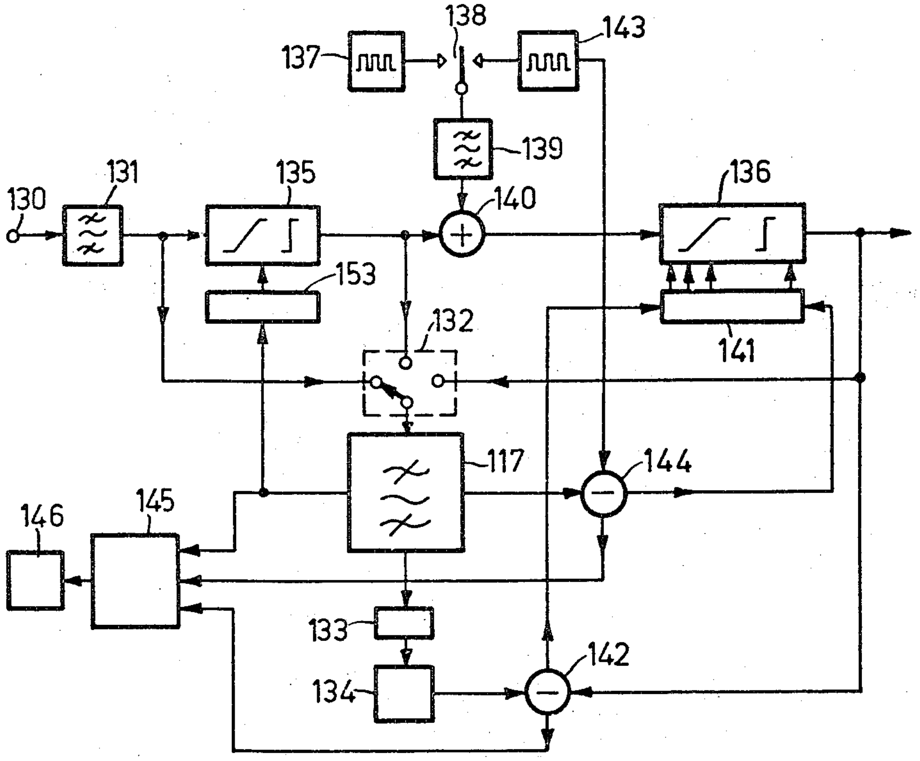

FIG. 18 is a block diagram of the equalizer.

Figure 19A:
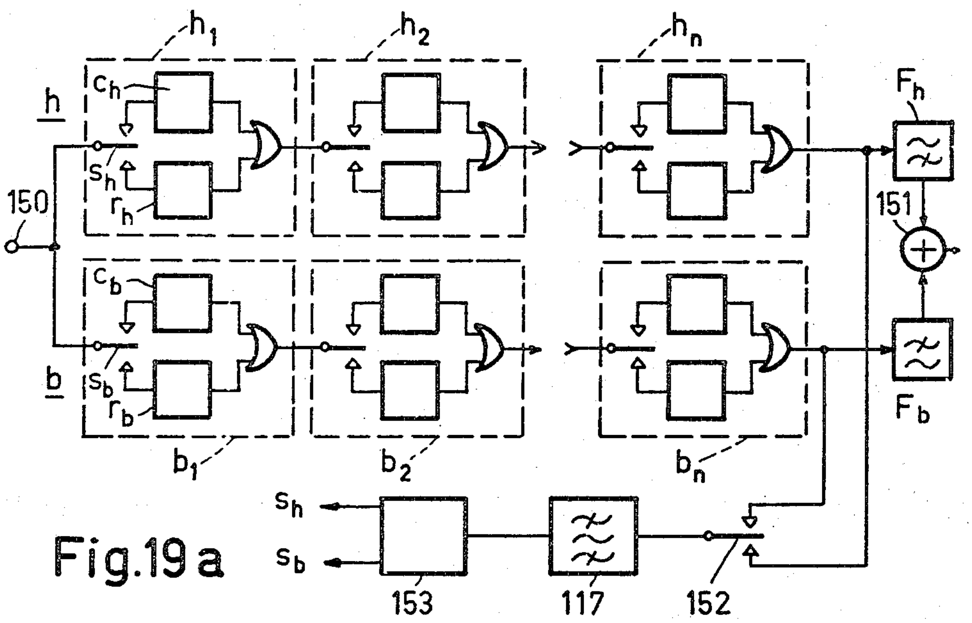
Figure 19B:
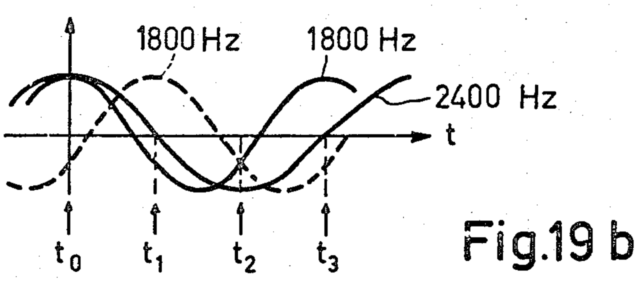

FIG. 19*a* is a circuit for coarse equalization and FIG. 19*b* shows the signals used.

Figure 20:
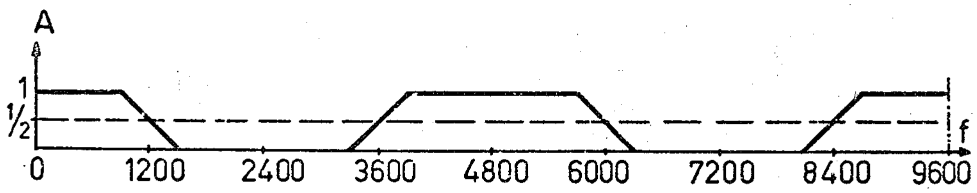

FIG. 20 shows the characteristics of a filter which is used to re-introduce given lines in the frequency spectrum of the matching signal and of the pilot signals.

Figure 21:
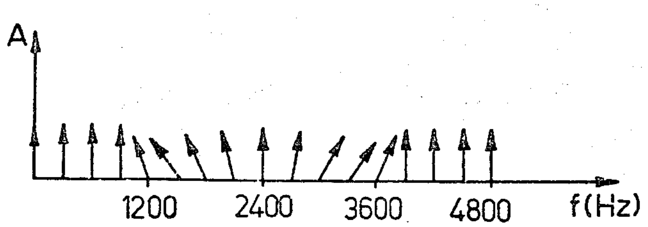

FIG. 21 shown the spectrum of a matching signal after coarse equalization.

Figure 22:
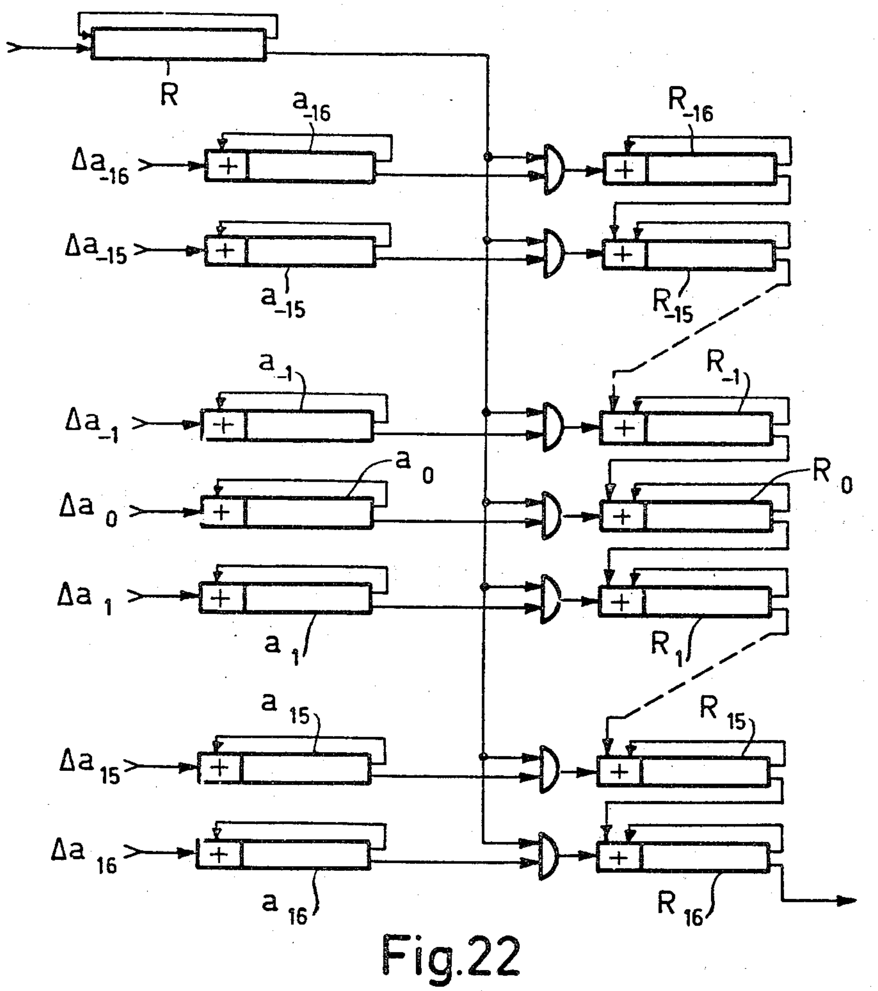
Figure 23:
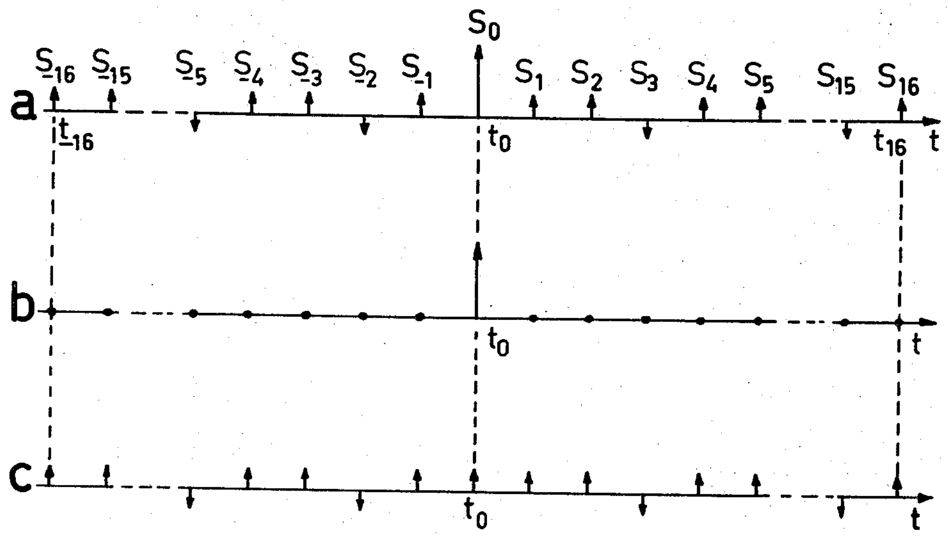

FIG. 22 shows a circuit diagram of an embodiment of the transversal fine equalizing filter and FIG. 23 shows the series of samples treated with this filter.

Figure 24:
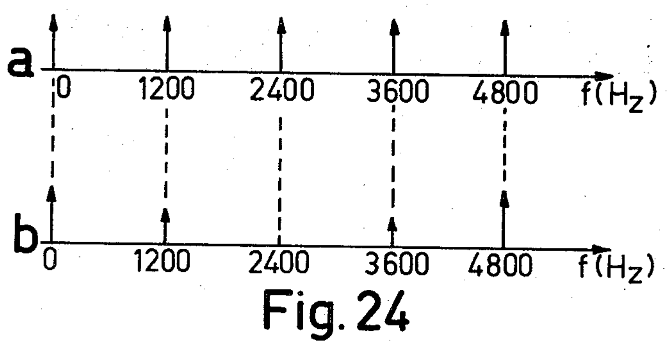
Figure 25:
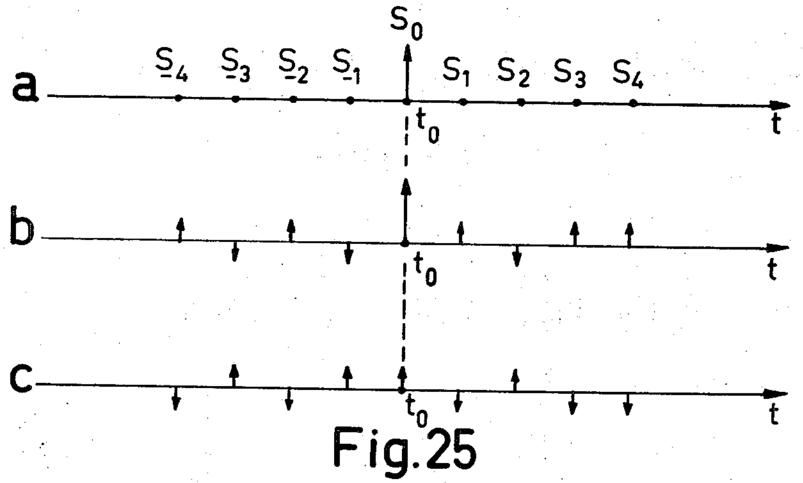

FIG. 24 shows the spectrum of the equalization control signal during transmission and FIG. 25 shows the series of corresponding samples.

The table according to FIG. 26 shows the process which is used in the transmitter for modulating orthogonal carriers.

The general structure and the operation of the simplest filters according to the invention will be described hereinafter, that is to say, the halfband-pass filters, the quarter bandpass filters, the ⅛-bandpass filters. Subsequently, the structure of the most general filter will be shown whose passband can be adjusted in steps having a bandwidth of $f_m/2^n$ in which $f_m$ is the maximum frequency of the spectrum of the input signal, while $n$ is an integer.

Figure 1:
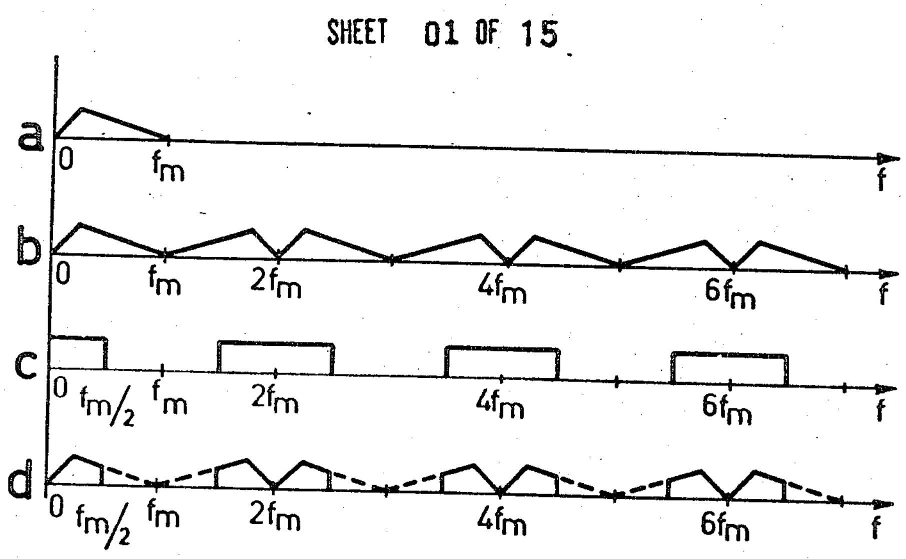

In the first place the characteristics of an elementary cell will be defined with the aid of FIG. 1, which cell is used for the manufacture of the filters according to the invention.

FIG. 1*a* shows the spectrum of the signal $s(t)$ which is restricted to the frequency band $o$–$f_m$ and whose samples at a frequency of $2f_m$ are treated by the cell. The spectrum of this sampled signal has the shape shown in FIG. 1*b*. It includes between 0 and $f_m$ the spectrum of the signal $s(t)$ prior to the sampling and furthermore two sidebands having a width of $f_m$ about the sampling frequency $2f_m$ and about the harmonics thereof, these sidebands corresponding to the modulation of carriers of the frequency $2f_m$ and harmonics thereof by the signal $s(t)$. An easy mathematical representation of the sampled signal which will hereinafter likewise be used is the following:

If T is equal to $\frac{1}{2}f_m$, the period of the samples, the signal in the band of $0 - f_m$ is equal to $s(t)$ in the band of $f_m - 3f_m$ it is equal to $s(t)\cdot\cos(2\pi t/T)$ in the band of $3f_m - 5f_m$ it is equal to $s(t)$—$\cos(4\pi t/T)$ in the band of $5f_m - 7f_m$ it is equal to $s(t)\cdot\cos(6\pi t/T)$ etc.

FIG. 1*c* shows the transfer function of an elementary filter cell whose cut-off is assumed to be infinitely sharp so as to simplify this representation.

FIG. 14 shows in this case the spectrum of the sampled signal $s(t)$ which is obtained at the output of the cell. The broken lines show the parts of the spectrum eliminated by the cell. It is then found that in the band of $0 - f_m$ to which the spectrum of signal $s(t)$ is restricted the cell passes all frequencies from the frequency 0 to the frequency $f_m/2$; for this reason this cell is referred to as a halfband-lowpass filter cell.

Since the digital filters are periodical in the frequency domain, the elementary cell also passes the frequencies in the two sidebands having a width of $f_m/2$ which are centered about the sampling frequency $2f_m$ and harmonics thereof.

The elementary cell used in the filter according to the invention must, however, also be aperiodic in the sense that, if the clock frequency thereof is divided by $2^n$, this cell causes a signal sampled at a $2^n$ times lower rate to undergo the same treatment. When, for example, the frequency of the incoming samples is $f_m$ or $f_m/2$ instead of $2f_m$, the cell will pass the bands of $0$–$f_m/4$ or $0 - f_m/8$ by dividing the clock frequency of the cell by 2 or 4.

In the described case in which the samples come in at a frequency of $2f_m$ a cell will be referred to as operating at "full" speed while in the two other cases cells will be referred to as operating at "half" speed or "quarter" speed.

For manufacturing such an elementary filter cell a non-recursive filter may be used such as is shown hereinafter, for example, a suitable combination of two filters of the type described in the above-mentioned French Patent Application No. 6,926,979 (PHN 4592). However, this is not necessary and a filter of the recursive type may alternatively be used.

Figure 2A:
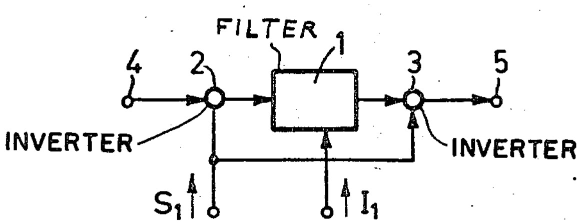
Figure 2B:
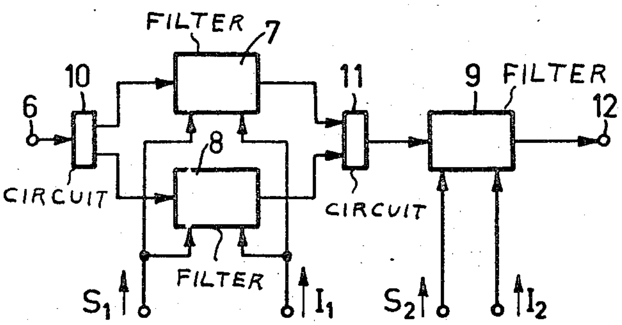
Figure 2C:
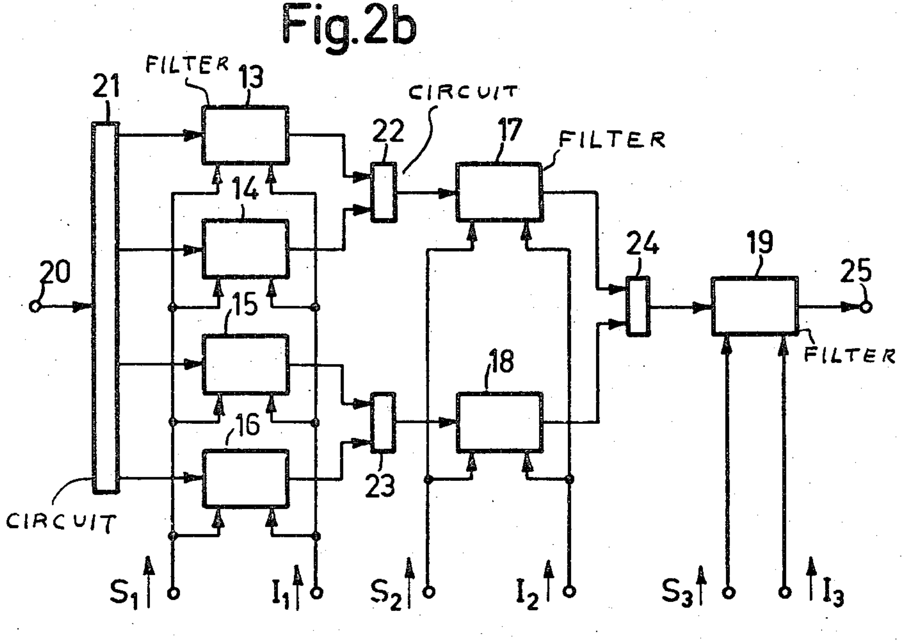

FIGS. 2*a*, 2*b*, 2*c* show the structures of some numerical filters according to the invention.

FIG. 2*a* shows the simplest structure of the filter, namely that of a halfbandpass filter.

According to the invention this filter has an elementary cell 1 of the kind described and circuits 2 and 3 for reversing the sign of every second incoming and outgoing sample of cell 1. This reversal is controlled by the logical signal $S_1$ which is referred to as band-selection signal and which has the value 1 for the case where a reversal is to take place, and has the value 0 in the opposite case. The inhibition of the filter function is controlled by the logical signal $I_1$ which assumes the value 1 for the case where an inhibition of the filter function is to take place, and assumes the value 0 in the opposite case. If the cell 1 is brought to its inhibitor state it operates as an all-pass filter which only delays the incoming samples over a constant period which is equal to the period of treatment of the samples when cell 1 operates as a filter. The input of the filter is denoted by 4 and its output is denoted by 5.

When the control signals have the values $S_1 = 0$, $I_1 = 0$, the filter according to FIG. 2*a* behaves as the elementary cell 1, that is to say, as a halfband-lowpass filter.

Figure 3:
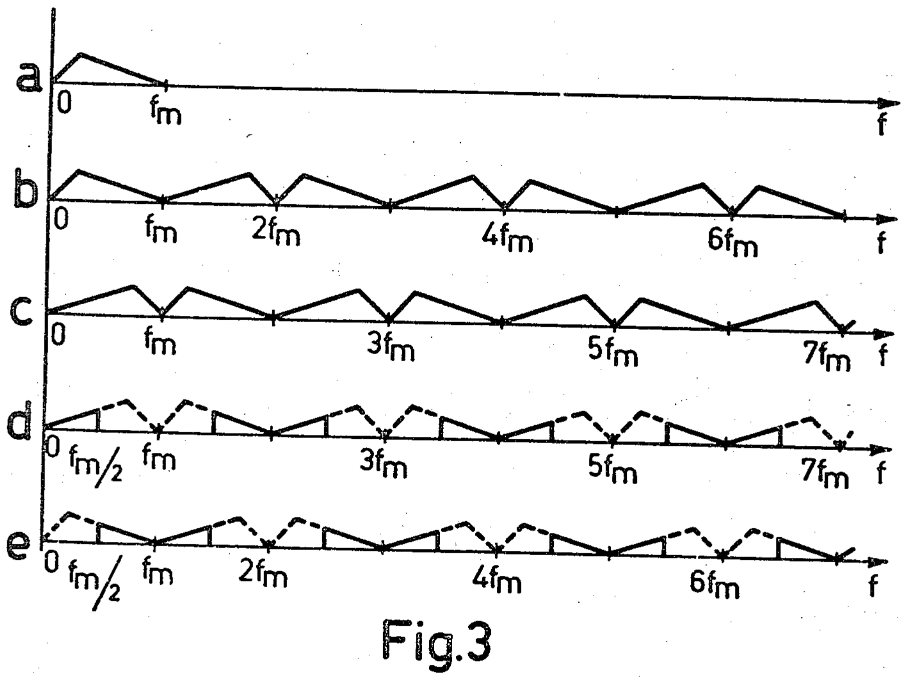
FIGS. 3, 4 and 6 show the characteristics of halfbandpass filters, quarter bandpass filters and ⅛-bandpass filters.

It will be shown with reference to FIG. 3, that due to the control signal $S_1 = 1$ the filter according to FIG. 2*a* becomes a halfband-highpass filter which has exactly the transfer function, which is symmetrical relative to $f_m/2$, of that of the elementary cell. FIGS. 3*a* and 3*b* show the spectrum of the signal $s(t)$ to be filtered and the spectrum of signal $s(t)$ sampled at a frequency of $2f_m$.

FIG. 3*c* shows the spectrum of the sampled signal $s(t)$ after reversal of the sign of every second sample with the aid of the control signal $S_1 = 1$ which is applied to an inverter circuit 2. It is these samples thus reversed in sign which are applied to cell 1. This treatment, which consists of a sign reversal of every second sample in a series of frequency $2f_m$, is equivalent to an amplitude modulation of a rectangular carrier of half the frequency $f_m$ by the signal $s(t)$. As a result the spectrum of the sampled signal $s(t)$ shown in FIG. 3c has two sidebands centered about carriers at the frequency $f_m$ and about odd harmonics thereof, the two sidebands corresponding to the modulation of the carriers by the signal $s(t)$.

FIG. 3d shows the spectrum of the sampled signal coming from the elementary cell 1. In accordance with the definition of this elementary cell the spectrum of the signal provided by the halfband-lowpass filter is obtained.

The samples coming from cell 1 are treated in inverter circuit 3 in accordance with the control signal $S_1 = 1$ so that every second sample is reversed in sign. This reversal is in this case likewise equivalent to the amplitude modulation of carriers of the frequency $f_m$ and odd harmonics thereof by the sampled signal $s(t)$ treated in cell 1.

FIG. 3e thus shows the spectrum of the sampled signal occurring at the output 5 of the filter. It is to be noted that this spectrum corresponds to the transfer function of a halfband-highpass filter: in the band of $0-f_m$ the halfband of $f_m/2$ to $f_m$ is passed.

When FIGS. 3e and 1d are compared it is found that due to the control signal $S_1 = 1$ the elementary cell which operates as a halfband-lowpass filter is converted into a halfband-highpass filter. It is of course possible to consider a halfband-highpass filter cell and to bring it in the lowpass condition by a reverse control signal $S_1$. The control signal $I_1$ (hereinafter referred to as inhibition control signal) required for establishing the inhibitor state is of little importance in the case of the halfbandpass filter.

Figure 4:
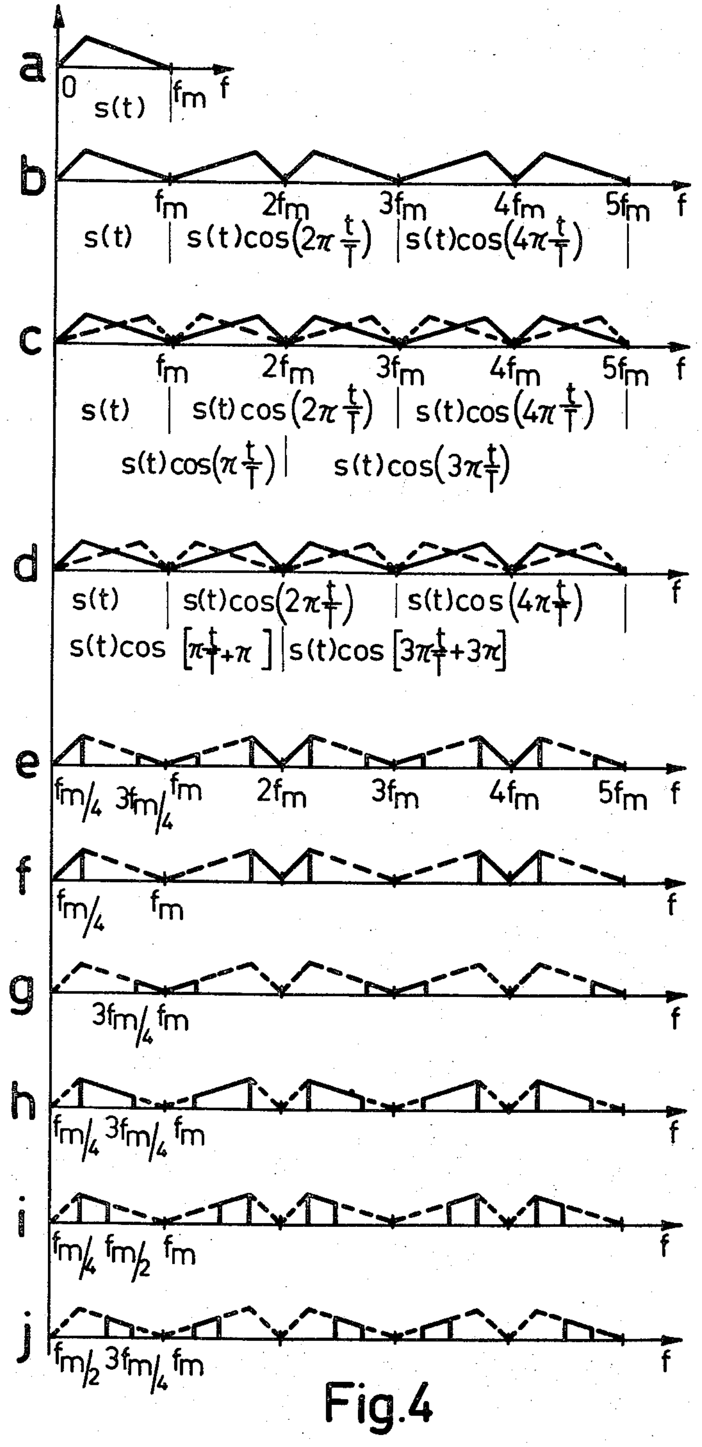

FIG. 2b shows the structure of a quarter bandpass filter according to the invention which uses the elementary halfband-lowpass cell as a basic element. The samples of the sginal $s(t)$ of frequency $2f_m$ are applied to input 6 of this filter. It includes three elementary filter cells which are grouped in two cascade-arranged stages. The first stage includes the two cells 7 and 8. The second stage includes a cell 9, The series of samples coming into the filter at a frequency of $2f_m$ is split up in a circuit 10 into two series of samples of frequency $f_m$ which series are separately applied to one of the two cells of the first stage, and the two series of samples which come from the first stage are combined in a circuit 11 so as to constitute a series of frequency $2f_m$ which is applied to cell 9 of the second stage. Each cell is provided with means for reversing the sign of every second incoming and outgoing sample and with means for inhibiting its filter function. For the sake of simplicity these means are assumed to be present in the blocks representing the cells. For the two cells 7 and 8 of the first stage the reversal of every second sample is controlled by the band-selection signal $S_1$ and the establishing of the inhibitor state is controlled by the inhibition control signal $I_1$. The corresponding control signals $S_2$ and $I_2$ are intended for cell 9 of the second stage. It will hereinafter be shown with the aid of FIG. 4 that, dependent on the value of the control signals $S_1$, $S_2$, $I_1$, $I_2$ the passband of the filter according to FIG. 2b may be controlled in width and position in steps having a bandwidth of $f_m/4$.

FIG. 4a shows the spectrum of the signal $s(t)$ to be filtered and FIG. 4b shows the spectrum of the signal sampled at a frequency of $2f_m$ which is received at input 6 of the filter of FIG. 2b.

By using the above-mentioned mathematical representation of the sampled signals, the signals occurring in the spectrum are indicated relative to each part of this spectrum. A series of samples of the frequency $f_m$ is applied with the aid of the circuit 10 to each of the two cells 7 and 8 and the samples of each series are delayed over a period T of the initial sampling frequency $2f_m$.

FIG. 4c shows the spectrum of the signal $s(t)$ sampled at a frequency of $f_m$ which signal occurs at the output of circuit 10 and is applied to cell 7. It includes the spectrum shown in solid lines which is equal to that of FIG. 4b, that is to say, the spectrum of $s(t)$ which extends from 0 to $f_m$ and the partial spectra each of which comprises two sidebands centered about the even harmonics of $f_m$. The spectrum according to FIG. 4c also comprises the partial spectra shown in borken lines each of which has two sidebands centered about odd harmonics of $f_m$.

FIG. 4d shows the spectrum of the signal which occurs at the output of circuit 10 and is applied to cell 8. This spectrum has exactly the same shape as that according to FIG. 4c.

The spectral representation of FIGS. 4c and 4d does not show the difference between the two series which occur at the output of circuit 10, which is caused by the fact that their samples are mutually shifted in time over $T = ½f_m$. This shift of the samples over the period T implies in the above-mentioned mathematical representation of the samples signals that the carriers of the same frequencies of the signals applied to cell 7 and to cell 8 have the phase shifts mentioned hereinafter:

For the carriers at the even harmonic frequencies of $f_m$, hence of frequencies $f = 2kf_m$, the phase shift is $2k\pi$ ($k$ is an integer).

For the carriers at the odd harmonic frequencies of $f_m$, hence at frequencies $f = (2k + 1)f_m$ the phase shift is $(2k + 1)\pi$ ($k$ is an integer).

Taking this phase shift into account the signals occurring in the spectra of FIGS. 4c and 4d have been shown with respect to each part of the spectra. The first line shows the signals which correspond to the spectra shown in solid lines: partial spectra centered about the frequencies $f - 2kf_m$. The second line shows the signals which correspond to the spectra shown in broken lines: partial spectra centered about the frequencies $f = (2k + 1)f_m$.

When first of all it is assumed that the cells 7 and 8 operate as all-pass filters, the re-combination in circuit 11 of the two series of samples leaving the cells 7 and 8 yields the original series of samples at a frequency of $2f_m$ whose spectrum is shown in FIG. 4b. It is readily evident that the addition of the signals shown with respect to the spectra of FIGS. 4c and 4d yields the signal which is shown with respect to the spectrum of FIG. 4b. It is then found that the carriers of frequencies which are equal to an odd multiple of $f_m$ and which are present in the two series applied to cells 7 and 8 are eliminated after combination of the two series in circuit 11. This is also the case when the two interlaced series undergo an identical filter treatment in the cells 7 and 8; the spectrum of the samples which are re-combined by circuit 11 will only include the spectral components of the original series.

FIG. 4*e* shows in solid lines the spectrum of the series of samples which are obtained at the output of circuit 11 when the two cells 7 and 8 are controlled (or programmed) by the control signal $S_1 = 0$, $I_1 = 0$. These two cells 7, 8 fed by a series of samples of the frequency $f_m$ operate at "half" speed and thus each behave as a halfband-lowpass filter with respect to the sampling frequency $f_m$. On the other hand the spectrum of the series of samples supplied by circuit 11 and originating from the recombination of the series supplied by the two cells 7, 8 only comprises the spectral components of the signal sampled at the frequency $2f_m$. This explains the shape of the spectrum of FIG. 4e which comprises components in the band of $0 - f_m$ which are located between 0 and $f_m/4$ and between $3f_m/4$ and $f_m$. This spectrum is of course found back in the two sidebands which are centered about the frequency $2f_m$ and the harmonics thereof.

The samples at the output of circuit 11 with the spectrum shown in FIG. 4e are applied to cell 9. This cell 9 to which the samples of frequency $2f_m$ are applied operates at "full" speed. If this cell is programmed by the two control signals $S_2 = 0$, $I_2 = 0$, it behaves as a halfband-lowpass filter. FIG. 4*f* then shows the spectrum of the sampled signal occurring at the output 12 of the filter. It is found that in the band of $0 - f_m$ the spectrum only comprises the components located between 0 and $f_m/4$; this spectrum is found back in the two sidebands which are centered about the frequency $2f_m$ and the harmonics thereof.

When cell 9 is programmed as a halfband-highpass filter by the control signals $S_2 = 1$ and $I_2 = 0$ while maintaining the control signals $S_1 = 0$, $I_1 = 0$, the signal with the spectrum which is shown in FIG. 4*g* is obtained at the output 12 of the filter; it is found that in the band of $0 - f_m$ the filter passes the partial band $3f_m/4 - f_m$.

When cell 9 is controlled by $I_2 = 1$ while maintaining the control signals $S_1 = 0$, $I_1 = 0$ the signal with the spectrum shown in FIG. 4*e* is obtained at the output 12 of the filter, irrespective of the control signal $S_2$. In the band of $0 = f_m$ the filter passes the two partial bands 0 $- f_m/4$ and $3f_m/4 - f_m$.

When the filter is programmed by the control signals $S_1 = 1$, $I_1 = 0$, $S_2 = 0$, $I_2 = 0$, the two cells 7 and 8 operate as halfband-highpass filters at "half" speed and at the output of circuit 11 a sampled signal is obtained with the spectrum shown in FIG. 4*h*. In the band of $0 - f_m$ the selected partial band extends from $f_m/4$ to $3f_m/4$. Since $S_2 = 0$, cell 9 operates as a halfband-lowpass filter at "full" speed and a signal having a spectrum unequal to zero in the partial band $f_m/4 - f_m/2$ is obtained at the output 12 of the filter as is shown in FIG. 4*i*.

When the filter is programmed by the control signals $S_1 = 1$, $I_1 = 0$, $S_2 = 1$, $I_2 = 0$, it is readily evident that the filter passes the partial band $f_m/2 - 3f_m/4$ as is shown in FIG. 4j.

When the filter is programmed by the control signals $S_1 = 1$, $I_1 = 0$, $I_2 = 1$, a signal whose spectrum corresponds to that of FIG. 4*h* is obtained at the output 12 of the filter, irrespective of the control signal $S_2$.

Finally it is evident that for the correct operation of the quarter bandpass filter of FIG. 2*b* the clock signals which control the operation of the three cells 7, 8 and 9 must be adapted in frequency and phase to the samples received by the cells. Thus the clock frequency of the cells 7 and 8 is half the clock frequency of cell 9, On the other hand the clock signal of cell 7 is in phase opposition with the clock signal of cell 8.

FIG. 2c shows the structure of a ⅛-bandpass filter according to the invention. It comprises seven cells which are grouped in three stages. The first stage comprises four cells 13, 14, 15, 16. The second stage comprise two cells 17 and 18. The third stage comprises one cell 19.

Figure 5:
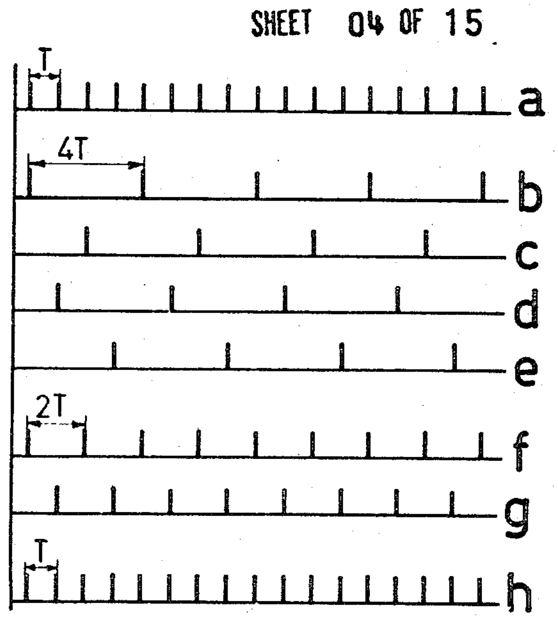
FIG. 5 shows the series of samples in a ⅛-bandpass filter.

The samples of frequency $2f_m$ which are received at input 20 are split up in a circuit 21 into four interlaced series of samples of the frequency $f_m/2$. FIG. 5*a* shows the series of incoming samples of frequency $2f_m$ and period T. FIGS. 5*b* to 5*e* inclusive show the four interlaced series of frequency $f_m/2$ in which the samples of one series are shifted in time relative to the samples of another series by an amount of T, 2T or 3T. The two series shown in FIGS. 5*b* and 5*c* whose samples exhibit a mutual time shift of 2T are applied, for example, to the cells 13 and 14 whose outgoing samples are combined in a circuit 22 so as to constitute the series shown in FIG. 5*f*. The two other series which are mutually shifted over a period 2T and are shown in FIGS. 5*d* and 5*e* are applied to cells 15 and 16 whose outgoing samples are combined in a circuit 23 so as to constitute the series shown in FIG. 5*g*.

The two series of the frequency $f_m$ and period 2T which are shown in FIGS. 5*f* and 5*g* are applied to the two cells 17 and 18 of the second stage and subsequently, after treatment, they are recombined by a circuit 24 which provides a series of the same frequency $2f_m$ as that of the samples coming into the filter. This series, which is shown in FIG. 5*h*, is subsequently treated by cell 19 on the third stage whose output is connected to the output 25 of the filter.

To obtain correct operation of the ⅛-bandpass filter of FIG. 2*c* the clock signals which control the operation of the cells of this filter must have the mutual frequencies and phases which correspond to the mutual frequencies and phases of the samples applied to the cells and shown in FIGS. 5*b* to 5*h* inclusive.

The control signals from the cells of the first stage, the second stage and the third stage are $(S_1, I_1)$, $(S_2, I_2)$ and $(S_3, I_3)$, respectively.

Figure 6:
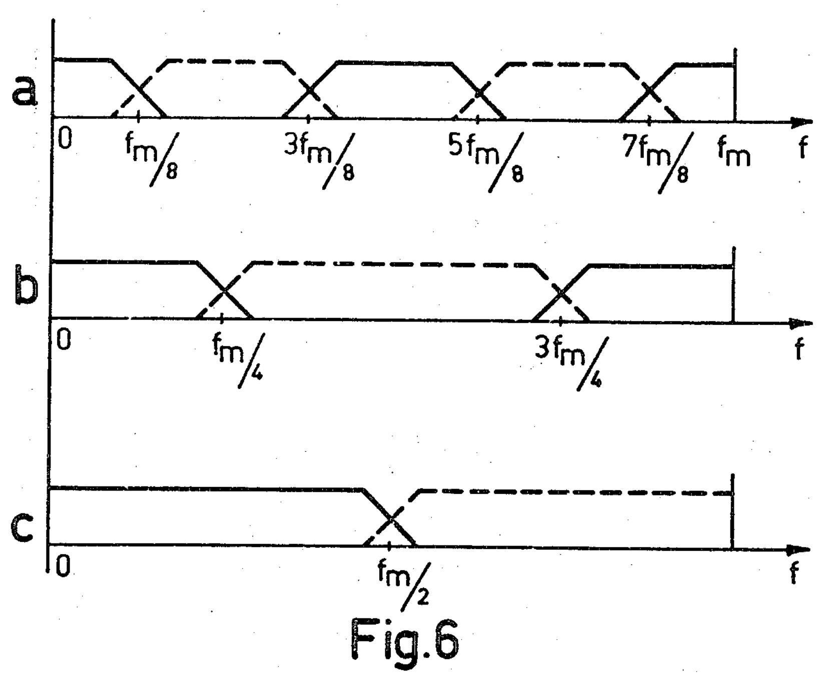

FIG. 6 shows the transfer characteristics of the cells of the three stages of the ⅛-bandpass filter dependent on the band-selection signal $S_1$, $S_2$ and $S_3$ applied thereto. FIG. 6 shows the real case of filter cells with finite slopes at the cut-off frequencies.

In the example chosen the slope increases from the first to the third stage and is multiplied by 2 from one stage to the next. FIG. 6*a* shows the partial bands which are selected by the four cells of the first stage; when $S_1 = 0$, the transfer function is represented by solid lines, when $S_1 = 1$ the transfer function is represented by broken lines. FIG. 6*b* shows the partial bands selected by the two cells of the second stage dependent on whether $S_2 = 0$ or $S_2 = 1$. FIG. 6*c* shows the partial bands selected by the cell of the third stage dependent on whether $S_3 = 0$ or $S_3 = 1$.

It will be readily evident with the aid of FIG. 6 that the following control signals are required to select, for example, the band of $0 - f_m/8$ at the output of the ⅛-bandpass filter:

for the band-selection: $S_1 = 0$, $S_2 = 0$, $S_3 = 0$ for the inhibition function: $I_1 = 0$, $I_2 = 0$, $I_3 = 0$.

To select the band $(5f_m/8 - 7f_m/8)$ the following control signals are to be applied:

for the band-selection: $S_1 = 1$, $S_2 = 0$ or $1$, $S_3 = 1$ for the inhibition function: $I_1 = 0$, $I_2 = 1$, $I_3 = 0$.

These examples show the simplicity of construction and the very great flexibility of use of the numerical filters according to the invention. They consist of a composition of elementary cells of the same type. It is sufficient to have cells having a limited number of values for the slopes in mutual ratios of 2:1 so as to obtain filters having a constant slope, irrespective of the selected band. These filters can easily be programmed with the aid of binary numbers stored in memories.

In the embodiment employing elementary cells of the non-recursive type the delay time is constant, irrespective of the program of the filter.

Figure 7:
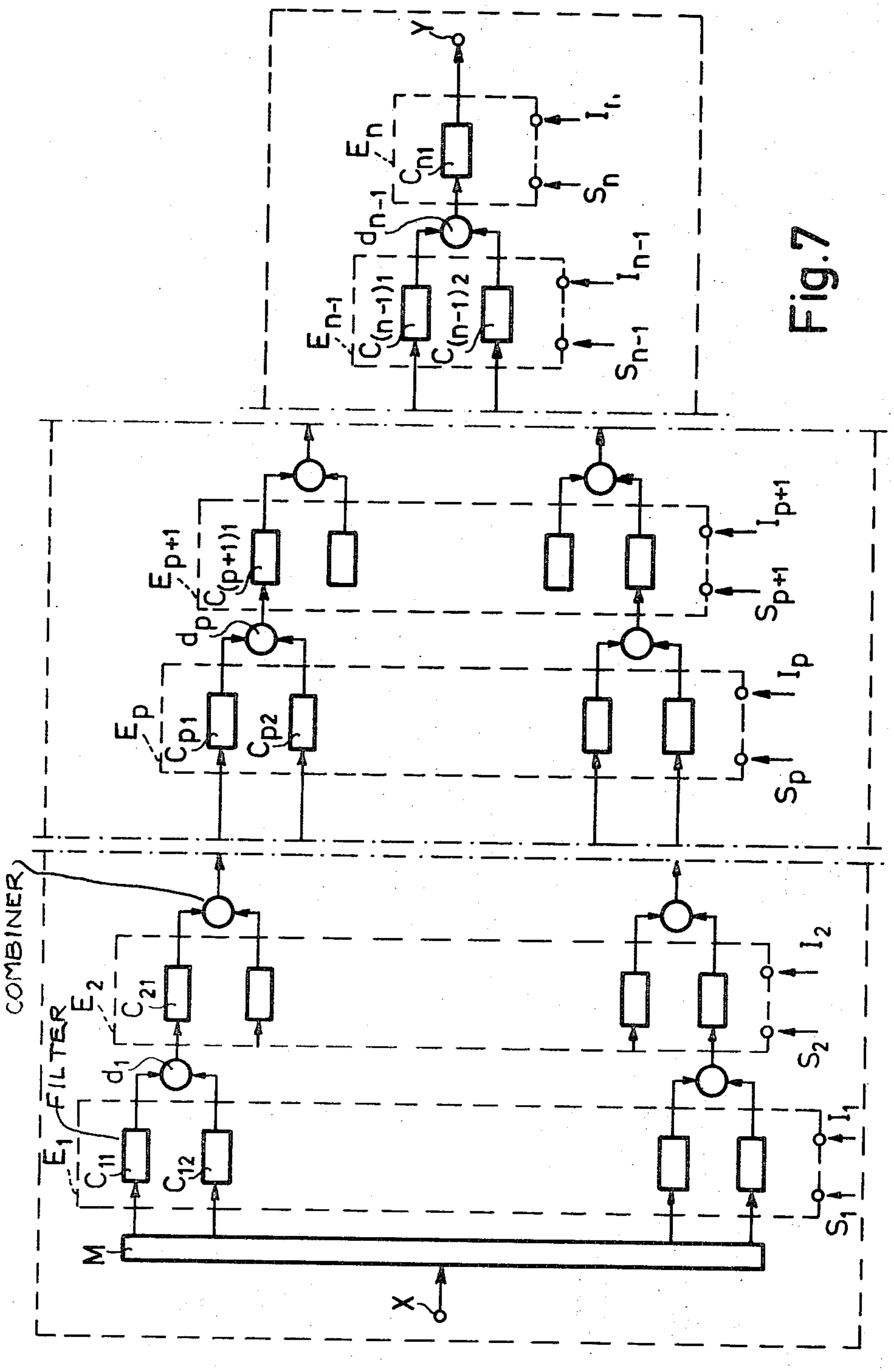
FIG. 7 shows the general structure of a filter having $n$ stages.

FIG. 7 shows the structure of a digital filter having $n$ stages which thus makes a selection in steps having a bandwidth of $f_m/2^n$ possible. The samples of frequency $2f_m$ enter the filter at input X.

According to the invention the filter includes $2^n - 1$ elementary halfbandpass filter cells of the same type which are grouped in $n$ cascade-arranged stages as is shown in FIG. 7 for the two first stages $E_1$, $E_2$, two successive intermediate stages $E_p$, $E_{p+1}$ and the two stages $E_{n-1}$, $E_n$. These stages $E_1$, $E_2$ . . . $E_p$, $E_{p+1}$.... $E_{n-1}$, $E_n$ have $2^{n-1}$, $2^{n-2}$, . . . , $2^{n-p}$, $2^{n-(p+1)}$, . . ., 2, 1 cells.

The series of samples entering input X at the frequency $2f_m$ is split up by the device M into $2^{n-1}$ interlaced series of frequency $2f_m/2^{n-1}$ which are separately applied to the $2^{n-1}$ cells of the first stage. The series which come from the cells of the first stage are combined pairwise so as to constitute $2^{n-2}$ series of regularly distributed samples of frequency $2f_m/^{n-1}$ which are applied to the $2^{n-2}$ cells of the second stage. The series which come from, for example, the cells $C_{11}$ and $C_{12}$ are combined in a circuit $d_1$ so as to constitute a regularly distributed series of samples which is applied to the cell $C_{21}$ of the second stage.

In the same manner the $2^{n-p}$ series, which come from the stage $E_p$ are combined pairwise so as to constitute $2^{n-(p+1)}$ series of regularly distributed samples of the frequency $2f_m/2^{n-(p+1)}$ which are applied to the $2^{n-(p+1)}$ cells of the stage $E_{p+1}$. The series of samples coming from the cells $C_{p1}$ and $C_{p2}$ are combined, for example, in a circuit $d_p$ so as to constitute a series of samples which is applied to the cell $C_{(p+1)1}$. Finally, the two series which come from the two cells $C_{(n-1)1}$ and $C_{(n-1)2}$ of the stage $E_{n-1}$ are combined in the same manner in a circuit $d_{n-1}$ so as to constitute a single series which is applied to the cell $C_{n1}$ of the last stage $E_n$. The samples coming from this cell constitute the series of samples of frequency $2f_m$ occurring at the output Y of the filter.

The clock signals which control the operation of the elementary cells have a mutual phase and a frequency which is suitable to operate these cells as halfbandpass filters for the respective frequencies of the samples applied thereto.

Each cell of the filter including $n$ stages is provided with means for reversing the sign of every second incoming and outgoing sample and with means for inhibiting its filter function. These means, which are not shown in drawing, are assumed to be incorporated in the cell.

Each stage ($E_1$ to $E_n$) has a terminal for controlling the reversal of all cells of the stage and a terminal for controlling the inhibition of all cells of the stage.

The passband of the filter may be varied in width and position in steps with a bandwidth of $f_m/2^n$ dependent on the value of the binary signals ($S_1$ to $S_n$) and ($I_1$ to $I_n$) which are applied to the $n$ terminals for controlling the reversal and to the $n$ terminals for controlling the inhibition, respectively.

A favorable embodiment of an elementary cell provided with means for controlling the band-selection and for controlling the inhibition will be described hereinafter with the aid of FIG. 8. This elementary cell is substantially a halfbandpass filter which can operate in a lowpass, highpass and all-pass condition.

For this embodiment two halfbandpass filters are used which are combined in a simple manner and which are described in the above-mentioned French Patent application No. 6,926,970. This application describes a halfband-lowpass filter which can be integrated on a large scale and which calculates the filtered samples in a very simple manner.

When, for example, in a series of 11 isolated samples $S_5$, $S_4$, $S_3$, $S_2$, $S_1$, $S_o$, $S_{-1}$, $S_{-2}$, $S_{-3}$, $S_{-4}$, $S_{-5}$ received by the filter these samples occur at the instants at which the inverse Fourier-transform of the filter assumes the characteristic values $a_5$, $a_4 = 0$, $a_3$, $a_2 = 0$, $a_1$, $a_o = 1$, $a_1$, $a_2 = 0$, $a_3$, $a_4 = 0$, $a_5$, respectively, the described filter provides the value of the filtered sample:

$$\phi = a_5 S_5 + a_3 S_3 + a_1 S_1 + a \cdot S_o + a_1 S_{-1} + a_3 S_{-3} + a_5 S_{-5}$$

In this example the filtered samples leave the filter at the frequency of the odd samples, hence hence at half the frequency of that of the incoming samples, which fact is favorably utilized in the above-mentioned patent application.

To achieve in the relevant numeral filter that the frequency of the outgoing filtered samples in each halfbandpass filter is the same as that of the incoming samples, two halfbandpass filters according to the above-mentioned patent application are used in which one filter provides a first series of filtered samples by treatment of the even samples located on either side of a central odd sample, while the other provides a second series of filtered samples by identical treatment of the odd samples which are located on either side of a central even sample. These two interlaced series are subsequently combined to a single outgoing series whose samples have the same frequency as that of the incoming samples.

Figure 8:
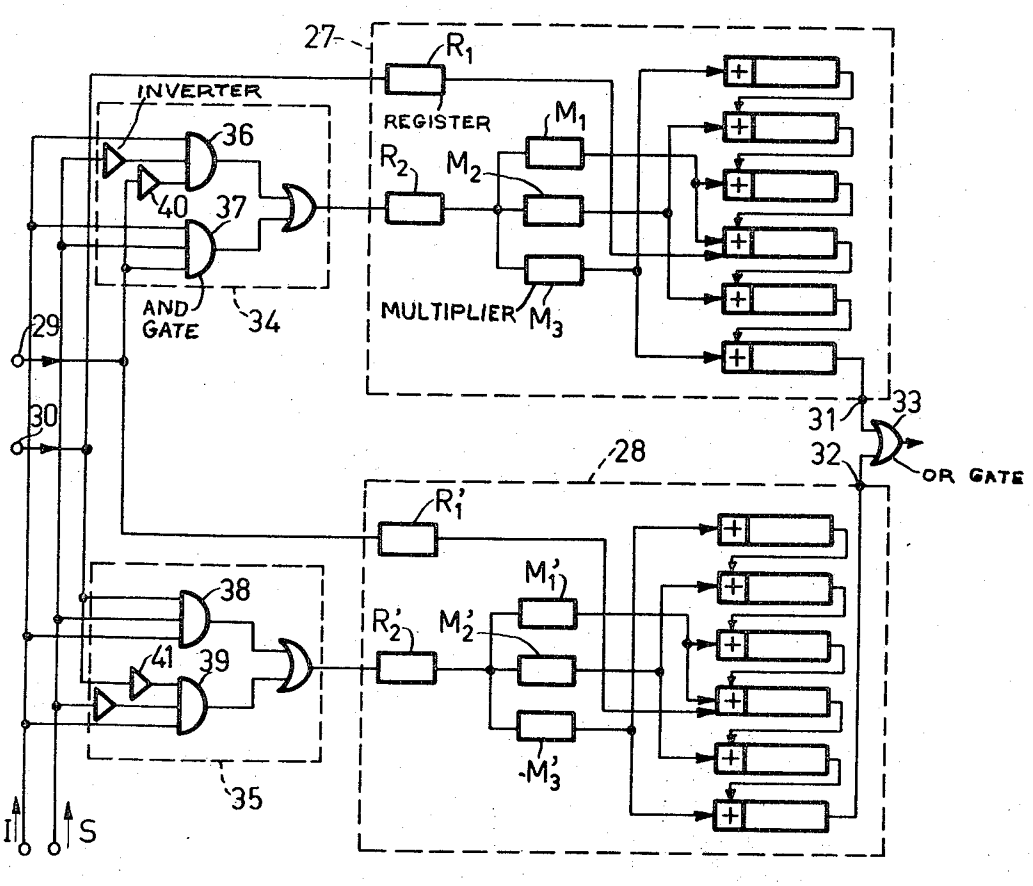
FIG. 8 shows the diagram of a preferred embodiment of an elementary cell which is used for the ⅛-bandpass filter according to FIG. 9.

FIG. 8 shows two identical halfbandpass filters 27 and 28. Each has the same structure and operates in the same manner as the filter described in the above-mentioned patent application. In the given case in which three coefficients $a_1$, $a_3$, $a_5$ are used which are not equal to zero and in which a central coefficient $a_o = 1$ is used each filter includes six registers arranged in cascase through adders, three circuits for multiplying by the coefficients $a_1$, $a_3$, $a_5$ which are denoted by M1, M2, M3 in filter 27 and by M'1, M'2 and M'3 in filter 28.

The binary numbers which represent the values of the samples and which are to be multiplied by the coefficients are stored in the registers R1 and R2 for filter 27 and in the registers R'1 and R'2 for filter 28.

The series of samples entering the filter is split up in known manner by a device not shown in the Figure into a series of odd samples which are applied to a terminal 29 and a series of even samples which are applied to a terminal 30. Register R2 of filter 27 receives the odd samples which are multiplied by the coefficients $a_1$, $a_3$, $a_5$ and register R1 of filter 27 receives the even samples which are each treated as a central sample. This filter 27 thus provides a first series of filtered samples at an output 31 in the rhythm of the odd samples. On the other hand it is the even samples in filter 28 which are multiplied by the coefficients $a_1$, $a_3$, $a_5$ and the odd samples which are each treated as a central sample. Filter 28 thus provides a second series of filtered samples at an output 32 in the rhythm of the even samples. These two interlaced series are re-combined in an OR-gate 33 so as to obtain the series of outgoing samples.

FIG. 8 likewise shows the means which make it possible for the assembly of FIG. 8 to operate as a lowpass, highpass or all-pass filter dependent on the value of the logical bandselection signal S and of the logical inhibition control signal I. These means consist of the two identical logical circuits 34 and 35 which apply the odd and even input samples to registers R2 and R'2 of filters 27 and 28, respectively.

The logical signal S influences the sign of the samples which are applied to registers $R_2$ and $R'_2$ so as to be subsequently multiplied by the non-central coefficients $a_1$, $a_3$ and $a_5$.

Firstly, it is assumed that for the operation as a lowpass filter the logical signal S is such that the AND-gates 37 and 38 pass the odd and even incoming samples, which have not undergone any sign reversal, to the registers $R_2$ and $R'_2$.

For operation as a lowpass filter the samples supplied by filter 27 have the value:

$$\phi_1 = a_o\ S_o + \epsilon\ a_j S_i$$

in which $a_j$ assumes the value $a_1$, $a_3$ or $a_5$ and $i$ assumes six odd values (odd samples).

The samples supplied by filter 28 have the value:

$$\phi_2 = a_o\ S_1 + \epsilon\ a_j S_i$$

in which $a_j$ likewise assumes the value $a_1$, $a_3$ or $a_5$ and $i$ assumes six even values (even samples).

In order to change the assembly of FIG. 8 from a half-band-lowpass filter to a halfband-highpass filter the sign of every second incoming and outgoing sample is reversed in the manner as already described.

For reversing the sign of every second incoming sample, for example the sign of the odd samples may be reversed. In that case the new values are obtained at the outputs of the filters 27 and 28:

$$\phi'_1 = a_o S_o - \epsilon\ a_j S_i\ (i\ \text{odd})$$

$$\phi'_2 = -a_o S_1 + \epsilon\ a_j S_i\ (i\ \text{even})$$

The samples of these values are combined in the OR-gate 33 at the output of which the sign of every second sample is to be reversed. By carrying out this reversal on the samples of the value $\phi'_2$, samples of the following value will ultimately be obtained:

$$\phi''_1 = \phi_1 = a_o S_o - \epsilon\ a_j S_i\ (i\ \text{odd})$$

$$\phi''_2 = a_o S_o - \epsilon a_j S_i\ (i\ \text{even})$$

This results in the value of the samples which are obtained when the assembly of FIG. 8 operates as a highpass filter.

It may be noted that these values can be obtained in a simpler manner: the transition form the pair of values ($\phi_1$; $\phi_2$) to the pair of values ($\phi''_1$, $\phi''_2$) may be effected by reversing, at the input of the filter, only the sign of the even and odd samples to be multiplied by the non-central coefficients $a_1$, $a_3$ and $a_5$.

This is effected in the filter of FIG. 8. In order to achieve that this filter operates as a highpass filter, such a logical signal S is applied that the AND-gates 36 and 39 cause the complements of the numbers which represent the even and odd samples to appear at the registers $R_2$ and $R'_2$; these complements are obtained with the aid of the inverter circuits 40 and 41.

The logical inhibition control signal I makes blocking of the AND-gates 36, 37 and 38, 39 possible. In this case only the samples to be multiplied by the central coefficient $a_o = 1$ are received by the registers $R_1$ and $R'_1$ of filters 27 and 28. The outgoing samples then have the same value as the incoming samples, but are delayed over a constant period. The assembly of FIG. 8 then behaves as a simple shift register.

Figure 9:
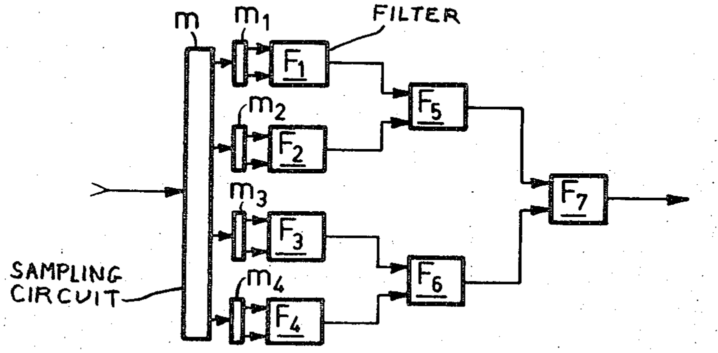

With this embodiment of such an elementary cell provided with control means for the band selection and the inhibition function the cascade arrangement for obtaining more intricate filters is very simple. The elementary cell then has two inputs, a so-called even input and a so-called odd input. In FIG. 9, for example, the structure of a ⅛-bandpass filter is shown which employs such an elementary cell.

The series of input samples of the frequency $2f_m$ is separated in a circuit $m$ into four interlaced series of the frequency $f_m/2$ which are each split up in circuits $m_1$, $m_2$, $m_3$ and $m_4$ into a series of even samples and a series of odd samples which are applied to the even and odd inputs, respectively, of the cells $F_1$, $F_2$, $F_3$ and $F_4$ of the first stage. The outgoing samples of the cells $F_1$ and $F_2$ are applied to the even and odd inputs, respectively, of cell $F_5$ and the outgoing samples of the cells $F_3$ and $F_4$ are applied to the even and odd inputs, respectively, of cell $F_6$. The outgoing samples of cells $F_5$ and $F_6$ of the frequency $f_m$ are applied to the even and odd iputs, respectively, of cell $F_7$ which provides the filtered samples in the rhythm of the frequency $2f_m$.

The type of numerical filter according to the inventio is particularly suitable for a data transmission system where all other signal operations are to performed in a numerical form so as to avoid interfaces (such as, for example, analog-to-digital converters). It is also necessary that for the different filters of the transmission system the ratio between the width of the selected band and the total width of the band to be transmitted is 1:2.

These conditions are fulfilled in the transmission system to be described hereinafter. In this system the spectrum of the transmitted signal becomes zero in the centre of the channel at frequencies which are divided regularly on either side of the central frequency; for equalizing the transmission channel pilot signals are introduced by means of numerical process at points where the spectrum of the signal becomes zero. The quadrature modulation used is likewise realized by means of numerical processes.

The following description comprises the example where the data signals to be transmitted are provided for the so-called "full" speed operation at a rate of 4800 bits/second.

FIG. 10 shows the block diagram of the transmitter. This transmitter has an input terminal 45 for the data signals and terminals 46 and 47 for the clock signal of the data signals having a frequency of 4800 Hz. In the case where the data clock signal is applied to terminal 46 of the transmitter the frequency of 4800 Hz is multiplied by, for example, 512 and drives, in the time base circuit 48, a controlled oscillator having a fundamental frequency of 2457· 5 kHz with the aid of which the local clock frequency of the transmitter is generated. In the case where the transmitter is to apply a clock signal to the data source the oscillator of the time base circuit 48 is a free running oscillator and its frequency is divided by 512 in order to apply the data clock signal to terminal 47.

The circuit for processing the data signal includes successively:

- two code converters 49 and 50 which process two series of interlaced samples of 2400 Hz which originate from the series of samples of 4800 Hz of the data signal;
- a modulator 51 in which the two series of 2400 Hz are combined and a quadrature modulation of the data signal is performed;
- a combination circuit 52 for introducing into the modulated data signal either pilot signals for the transmission at "full" speed which are supplied by a circuit 53, or pilot signals for the transmission at "half" speed which are supplied by a circuit 54. The switch 55 makes the transition from "full" speed operation to "half" speed operation possible;
- a switch 56 makes it possible to transmit a special adaptation signal provided by a circuit 57 in order to perform a first equalization before the transmission of the data signal;
- a numerical filter 58 for constituting the signal to be ultimately transmitted;
- a numerical filter 59 for selecting the band of 6000–8400Hz;
- a digital-to-analog converter 60;
- a carrier modulator 61 fed by a square-wave carrier which performs a transposition from the band of 6000 – 8400 Hz in which the signal is present, to the band of 515 – 2915 Hz. For this transposition the square-wave carrier has a frequency of 5485 Hz which is obtained by dividing the frequency of the oscillator in the time base circuit 48 by 447 with the aid of the divider 62;
- a simple analog filter 63 for eliminating the unwanted residues of the previous modulation and for the purpose of retaining only the band of 515 to 2915 Hz.

The numerical operations to be performed in this data signal processing circuit will hereinafter be described in detail. The code converters 49 and 50 convert the two incoming series of interlaced samples of 2400 Hz into a bipolar code of the second order and simultaneously the three elements +1, 0, −1 of the bipolar code are represented in a system having 10 binary elements: + 1 is represented by the number 1 100 000 000, 0 is represented by 1 000 000 000, −1 is represented by 0 100 000 000.

It is known that the bipolar code of the second order consists of the distinction of elements of an even order and of odd order in a series of binary elements; subsequently a first-order bipolar coding is performed in each series of even elements and in each series of odd elements in which the value 0 for binary elements of the value 0 is retained and in which the binary elements of the value 1 are alternately given the values +1 and −1.

In the example chosen the spectrum of the signal converted into the second-order bipolar code and supplied by each of the code converters 49 and 50 has the known raised-cosine shaped which is shown in FIG. 11. In this Figure it is found that the spectrum becomes zero at the frequency 0 and at multiples of an elementary frequency of 1200 Hz. A signal having such a spectrum is entirely adapted to be treated by numerical filters according to the invention. The selection performed by these filters is effected in partial bands having a bandwidth of 1200 Hz.

The numerical process which is used in the transmission system according to the invention to modulate two arbitrary sampled signals $s(t)$ and $\sigma(t)$ on two quadrature carriers will hereinafter be described in a general manner. This process is used in modulator 51 for the two signal provided by the code converters 49, 50.

This process will be explained with reference to FIG. 26. It is assumed that only in the band of $0 - f_m$ the spectrum of the signals $s(t)$ and $\sigma(t)$ differs from zero and that the signals are sampled at a frequency $2f_m$. T is the period of the samples. The first line of the table in FIG. 26 shows: a diagram D of the spectrum of the signal $s(t)$ sampled at the frequency $2f_m$. The spectrum has the known shape previously shown and includes carriers at the sampling frequency $2f_m$ and at multiples thereof. The second line includes the mathematical representation $\phi_1(t)$ of the sampled signal which has the value $s(t)$ between 0 and $f_m$, the value $s(t)\cdot\cos(2\pi t/T)$ between $f_m$ and $3f_m$, the value $s(t)\cdot\cos(4\pi t/T)$ between $3f_m$ and $5f_m$, the value $s(t)\cos(6\pi t/T)$ between $5f_m$ and $7f_m$, etc.

If the sampling pulses of the signal $s(t)$ are delayed over a period T/4, the spectrum of the sampled signal has the same shape as the spectrum D, but this time delay is equivalent to the phase shift over $k\pi/2$, of the carriers of the frequency $2kf_m$ in which $k$ is an integer which represents the order of the carrier. The sampled signal then has the values which are plotted on the line behind $\phi_2(t)$ in FIG. 26.

Likewise a delay of sampling pulses over a period T/2 implies that the carriers of the frequency $2kf_m$ are shifted over $k\pi$ in phase. The sampled signal then has the values shown in FIG. 26 on the line behind $\phi_3(t)$.

Likewise a delay of the sampling pulses over a period of 3T/4 means that the carriers of the frequency $2kf_m$ are shifted over $k3\pi/2$. The sampled signal then has the values shown in FIG. 26 on the line behind $\phi_4(t)$.

An identical table could be formed for another signal $\sigma(t)$ whose spectrum differs from zero in the band of $0 - f_m$ and which is sampled at a frequency $2f_m$. In the table of FIG. 26 the line behind $\phi_5(t)$ only states the values of the signal $\sigma(t)$ which is sampled by pulses which are shifted over a period T/4 with respect to sampling pulses for the signal $s(t)$.

When the sampled signals shown on lines $\phi_1(t)$ and $\phi_5(t)$ are added, a sampled signal is obtained which is shown on the line behind $\phi_6(t)$. It may be noted that in the bands of $f_m - 3f_m$ and $5f_m - 7f_m$ the sampled signal $\phi_6(t)$ has the value:

$$s(t)\cos 2\pi t/T + \sigma(t)\sin 2\pi t/T \text{ and}$$
$$s(t)\cos 2\pi 3t/T - \sigma(t)\sin 2\pi 3t/T$$

These values show that the sum of the signals $s(t)$ and $\sigma(t)$ modulated on quadrature carriers is obtained in these two bands.

The numerical process for realizing the modulation of two arbitrary signals $s(t)$ and $\sigma(t)$ sampled at the same frequency on two quadrature carriers simply consists of delaying the samples $s(t)$ and $\sigma(t)$ over a quarter of the sampling period T and of adding the two series of samples thus obtained.

The use of this modulation method will hereinafter be described with reference to FIG. 12 for the data signal which is applied to the transmitter of FIG. 10.

FIG. 12 shows a block diagram of all operation performed in the two code converters 49 and 50 and modulator 51. The series of data samples at a rate of 4800 bits/sec which is applied through line 65 is split up in a circuit 66 into two interlaced series having a rate of 2400 bits/sec which are applied to lines 67 and 68, respectively.

These two series are in turn split up into two interlaced subseries having rates of 1200 bits/sec. The series originating from line 67 is split up in a circuit 69 into two subseries which are applied to lines 70 and 71, the series originating from line 68 is split up in a circuit 72 into two subseries which are applied to lines 73 and 74. The four subseries of 1200 bits/sec thus formed are converted into a duobinary code by means of the code converters 75, 76, 77, 78.

It is known that for the conversion of a series of binary elements 0 or 1 into a series of ternary elements having values of 0, +1 of −1 in accordance with the duo-binary code, the following rules are to be taken into account: the elements 0 of the original series retain the value 0. The elements 1 of the original series may assume new values +1 or −1; if the number of elements 0 of a series of successive elements 0 separating two series of successive elements 1 is even, the same sign is allotted to the elements 1 of these two series; if the said number of elements 0 is odd, the sign of the elements 1 of the second series is inverted.

The series of binary elements ($a$) is converted into for example, the series ($b$) in the duo-binary code,

*a.* 0 1 1 1 0 0 1 0 1 1 1 0 0 1

*b.* 0 + + + 0 0 + 0 − − − 0 0 −

The spectral energy density of the signal of the subseries of 1200 bits/sec which are coded in the duobinary form has the shape shown in FIGS. 13*a* and 13*b*. It is a raised-cosine curve according to the equation $A = \frac{1}{2}(1 + \cos \pi fT)$ in which T is the period of the samples and has a value of 1/1200 sec.

More particularly FIG. 13*a* shows the spectrum of the series of samples provided by the code converter 75 and the corresponding signals. A signal $s(t)$ corresponds to the spectrum in the band of 0 – 600 Hz. The signals $s(t) \cos (2 \pi t/T)$, $s(t) \cos (4 \pi t/T)$, $s(t) \cos (6 \pi t/T)$ etc. correspond to the spectra having a width of 1200 Hz which are centred about the sampling frequency of 1200 Hz and its multiples.

Likewise FIG. 13*b* shows the spectrum of the series of samples provided by the code converter 76 and the corresponding signals A signal $\sigma(t)$ corresponds to the spectrum in the band of 0–600Hz. The signals $\sigma(t) \cos(2 \pi t/T + \pi)$, $\sigma(t)\cos (4 \pi t/T + 2\pi)$, $\sigma(t)\cos(6 \pi t/T + 3\pi)$ etc. correspond to the spectra having a width of 1200 Hz and being centred about the sampling frequency of 1200 Hz and its multiples.

Apparently a phase shift of $k \pi$ occurs between the carriers of the same frequency of the two signals provided by code converters 75 and 76 ($k$ represents the order of the carrier). This is the result of the fact that the samples dealt with by code converters 75 and 76 have a time shift of $T/2 = 1/2400$ sec.

A sign reversal for every second sample is performed with the aid of the circuits 79 and 80 on the two series provided by code converters 75 and 76. This sign reversal is equivalent to an amplitude modulation of the signals $s(t)$ and $\sigma(t)$ on a square-wave carrier at a frequency of 600 Hz. The carriers of 600 Hz on which the signals $s(t)$ and $\sigma(t)$ are modulated are in phase quadrature.

The spectra of the samples thus reversed, which are provided by the circuits 79 and 80, thus have the shape shown in FIGS. 13*c* and 13*d*, respectively. The frequencies of the carriers are then located at 600 Hz and its odd multiples. The corresponding signals are shown in the bands having a width of 600 Hz which are centred about these carriers.

It is to be noted that the spectra of the signals shown in FIGS. 13*c* and 13*d* have the shape of the spectra of the sampled signals converted into a bipolar code of the second order. Returning to the above-mentioned example of the series of binary elements ($a$), which series is converted into the duo-binary code series ($b$), it can be verified that by reversing the sign of every second element of the series ($b$), the series ($c$) is obtained which is exactly the series ($a$) converted into the bipolar code:

($s$) 0 − + − 00 + 0 − + − 00 +.

If only the band of from 1200 to 3600 Hz is considered in the spectrum of the samples supplied by the circuits 79 and 80 and now converted into a bipolar code of the second order, it is found from FIGS. 13*c* and 13*d* that the signals which correspond to this band are:

for 75: $s(t) [\cos 3 \pi t/T + \cos 5 \pi t/T] = s(t) [\cos \pi t/T \cos 2 \pi 2t/T]$ for 76: $\sigma(t) [\sin 5 \pi t/T - \sin 3 \pi t/T] = \sigma(t) [\sin \pi t/T \cos 2 \pi 2t/T]$ The two subseries of 1200 bits/sec which are obtained at the output of the circuits 79 and 80 are combined in an interlaced form in a circuit 81 so as to constitute a single series of 2400 bits/sec on line 82. The signal corresponding to this series in the band of from 1200 to 3600 Hz is obtained by adding the corresponding signals to the series provided by the circuits 79 and 80; the result then is:

$[s(t) \cos \pi t/T + \sigma(t) \sin \pi/T\, t] \cos 2 \pi 2t/T = S(t) \cos 2 \pi 2t/T$ Thus a double sideband modulated signal having a carrier frequency of $2/T = 2400$ Hz is obtained on line 82, together with the two sidebands of 1200–2400 Hz and of 2400–3600Hz each of these bands having a width of 1200 Hz where the signals $s(t)$ and $\sigma(t)$ of the two subseries modulated on two orthogonal carriers of the frequency $1/2T = 600$ Hz are found.

Exactly the same operations can be performed with the two subseries of 1200 bits/sec which are provided by the code converters 77 and 78, that is to say, sign reversal of every second sample of these two subseries by the circuits 83 and 84, subsequently an interlaced combination in a circuit 85 of the two subseries thus treated. By referring to the signals of the subseries thus treated by the two code converters 77 and 78 as $s'(t)$ and $\sigma'(t)$, a signal is obtained in the band of 1200 – 3600 Hz on line 86 which signal has the shape:

$[s'(t) \cos \pi t/T + \sigma'(t) \sin \pi t/T] \cos [2 \pi 2t/T + \pi] = S'(t) \cdot \cos [2 \pi 2t/T + \pi]$ Thus a phase shift of $\pi$ exists between the carriers of frequencies $2/T = 2400$ Hz on which the signals S ($t$) and S'($t$) are modulated. This is the result of the fact that the two series of 2400 Hz of these modulated signals exhibit a mutual time shift of 1/4800 sec. just like the two series of 2400 Hz from which they originate and which are present on the lines 67 and 68.

To double the capacity of the channel of 1200 – 3600 Hz by introducing the two signals S($t$) and S'($t$) which are double-sideband modulated on the two quadrature carriers of 2400 Hz, the process explained hereinbefore is employed which consists in delaying the samples of the two signals over a quarter of their period and in combining the two series of samples obtained.

In order to realize this for the two series of 2400 Hz which occur on the lines 82 and 86, the sampling frequency is increased to 9600 Hz with the aid of the circuits 87 and 88; to this end it is sufficient to insert three zeros (represented by the binary number 10 0 0 0 0 0 0 0 0) between two successive elements of each series. Subsequently one of the two series thus obtained is delayed over one period of 9600 Hz, for example, over a quarter of a period of 2400 Hz.

The sum of the signals S($t$) and S'($t$) modulating on two quadrature carriers of 2400 Hz is then obtained in a circuit 89 where the two series of 9600 Hz thus delayed are added.

The signal on line 90 is then obtained which signal is given in the band of 1200 – 3600 Hz by:

$$S(t) \cos 2\pi\, 2t/T + S'(t) \sin 2\pi\, 2t/T$$

with $S(t) = s(t) \cos \pi t/T + \sigma(t) \sin \pi t/T$ $S'(t) = s'(t) \cos \pi t/T + \sigma'(t) \sin \pi t/T$ FIG. 13e shows the spectrum of the signal which is obtained on line 90, which in the general circuit diagram of the transmitter of FIG. 10 is the spectrum of the signal which is obtained at the output of modulator 51. A double line shows the useful parts of the spectrum which are located in the frequency bands where the sum of the signals S($t$) and S'($t$) modulated on quadrature carriers of 2400 Hz is obtained.

The role of filter 58 for the shape of the final signal consists of the selection of these frequency bands:

1200 – 3600 Hz, 6000 – 8400 Hz, 10800 – 13200 Hz, etc.

The samples to be treated by this filter occur at a rate of 9600 samples per second.

It will now be investigated which steps are to be taken in the transmitter of FIG. 10 to introduce the signals for locking the receiver and for automatically equalizing the transmission channel into the bands selected by filter 58.

Firstly, pilot signals are introduced during the data transmission at "full" speed (4800 bits/sec) by means of numerical processes at frequencies where the spectrum of the modulated signal becomes zero. In the band of 1200 – 3600 Hz these pilot signals are at frequencies of 1200 Hz, 2400 Hz and 3600 Hz. It is the circuit 53 which transmits the corresponding digital signal. The digital signal transmitted by circuit 53 for constituting these pilot signals consists of the series of samples:

—00 1 0000000 1 0000000 1 0000000 1 00 . . .

in which the samples 1 or 0 are transmitted at a speed of 9600 samples per second.

In this series the elements 1 are each converted into a number having then binary elements: 0010000000 (which means ¼ in the code chosen. The elements 0 are each converted into a number having ten binary elements comprising ten successive zeros. In the band of 0 – 4800 Hz (half the of frequency of the samples) the spectrum of these samples consists of spectral lines having an equal amplitude (for example, 1) and spectral lines of half the amplitude (½ in this example) for the frequencies of 0 and 4800 Hz. This is shown in FIG. 14.

FIG. 14a shows sinusoidal signals of the frequencies 1200, 2400, 3600 Hz of amplitude 1 which have a value of 1 at the instant $t = o$. FIG. 14b shows a direct current signal of amplitude ½ and a sinusoidal signal of amplitude ½ which likewise have a value of ½ at the instant $t = o$. Arrows show the sampling instants which occur at a frequency of 9600 Hz at such a phase that sampling occurs at the instant $t = o$. The sum of the value of the samples of each Figure is shown below these arrows. It is readily evident that by adding all values to the Figures the series of samples shown in FIG. 14c is obtained, which is the desired series which consists of a sample of a value 4 in the chosen example, followed by seven samples of the values 0 . The samples of the value 4 occur at a frequency of 1200 Hz.

To obtain this series only a direct current signal is to be sampled in the circuit 53 in the rhythm of a frequency of 1200 Hz and seven samples having a value of 0 are to be inserted in a regular manner between these samples of 1200 Hz.

The elements of this series are added with the aid of switch 55 and adder circuit 52 to the elements of the series of samples provided by modulator 51. The series of samples coming from adder circuit 52 is applied by switch 56 to the input of signal filter 58 during transmission.

This filter is a numerical quarter bandpass filter according to the invention to which filter a series of samples of a frequency of 9600 Hz is applied. FIG. 13f shows the transfer function. When this filter is suitably programmed for obtaining this transfer function, this filter provides a series of samples whose spectrum is shown in FIG. 13g. This spectrum includes the spectrum of the modulated signal located in the useful bands of 1200 – 3600 Hz and 6000 – 8400 Hz, etc. as well as the spectral lines of the pilot signals at the frequencies in these bands where the spectrum of the signal becomes zero, which spectral lines of the pilot signals at the band ends have an amplitude which is half that of the spectral line of the pilot signal in the centre of the band.

On the other hand it is necessary in the equalizer used in the receiver that the transmitter provides a so-called adaptation signal prior to the transmission, which signal includes spectral lines at frequencies which are multiples of 300 Hz. The circuit 57 of the transmitter provides the corresponding digital signal. This signal is obtained by the series of samples:

$$\ldots 001\ \underbrace{000 \ldots 000}_{31}\ 1\ \underbrace{000 \ldots 000}_{31}\ 1\ \underbrace{000 \ldots 000}_{31}\ 1\ 00 \ldots$$

the successive elements of which are transmitted at a frequency of 9600 Hz and the elements 1 of which are transmitted in a rhythm of 300 Hz.

To obtain this series in the circuit 57 only a direct current signal is to be sampled at a frequency of 300 Hz and 31 samples having a value of 0 are to be inserted in a regular manner between these samples of 300 Hz.

The amplitude of the significant samples in the rhythm of 300 Hz is converted into a number of ten binary elements: 111111111. The samples 0 are converted into a binary number: 0000000000.

Prior to the signal transmission, switch 56 applies the series thus formed to the input of filter 58. The spectrum of the adaptation signal which is then provided by filter 58 is shown in FIG. 13*h.* It includes spectral lines of equal amplitude within the useful bands, with the exception of the spectral lines at the band ends which have half the amplitude.

Finally the transmitter includes a circuit 54 which makes it possible to transmit, during transmission, pilot signals at frequencies which are a multiple of 600 Hz. As will be apparent from the description of the receiver, this circuit 54 is used when the equalizer cannot effect complete equalization of the channel during transmission at "full" speed (4800 bits/sec). In this case the transmission is performed at "half" speed (2400 bits/sec) and this pilot signal transmitted by circuit 54 is added in adder circuit 52 to the signal provided by modulator 51.

In order to transmit a digital signal which includes pilot signals at frequencies which are a multiple of 600 Hz, a direct current signal having a frequency of 600 Hz is sampled in circuit 54 and fourteen samples of the value 0 are inserted between these samples of 600 Hz. The series of samples then obtained is:

$$. . 00\ 1\ \underbrace{00 \ldots . 00}_{14}\ 1\ \underbrace{00 \ldots\ldots 00}_{14}\ 1\ \underbrace{00 \ldots\ldots 00}_{14}\ 1\ 00 \ldots$$

the successive elements of which are transmitted at a frequency of 9600 Hz. The amplitude of the significant samples of 600 Hz is converted into a number of 10 binary elements 0100000000, while the samples of the value 0 are converted into the number 0000000000.

After addition of the elements of this series to the elements of the series of the modulated signal in adder circuit 52 and after filtering by filter 58, a signal is obtained whose spectrum is shown in FIG. 13*i.* This spectrum consists of the spectrum of the data signal at "half" speed and of the pilot spectral lines at frequencies where the spectrum of the data signal becomes zero. These pilot spectral lines have the same amplitude, with the exception of the spectral lines at the band ends which have half the amplitude.

In the transmitter of FIG. 10 the following operations are performed on the signal provided by filter 58 and having the shape of a series of samples of 9600 kHz.

The sampling frequency is increased to 38400 Hz by introducing three samples having a value of 0 between two successive significant samples.

This series of samples of 38400 Hz is applied to the input of a numerical ⅛-bandpass filter 59 according to the invention. This filter is suitably programmed for selecting the bands of 6000 – 8400 Hz, 30,000 – 32,400 Hz, etc. . . .

The series of samples provided by filter 59 is applied to a digital-to-analog converter 60 which is provided with a lowpass filter not shown in the drawing at whose output only the band of from 6000 to 8400 Hz is obtained. This digital-to-analog converter is, for example, the converter described in the above-mentioned French Patent application No. 6,926,970 (PHN 4592).

This band of 6000 – 8400 Hz is frequency-transposed with the aid of modulator 61 to the band of 515 – 2915 Hz which is centred about the frequency 1715 Hz. The square-wave carrier having a frequency 5485 Hz is obtained by dividing the frequency of the time base circuit 48 by 447. The analog filter 63 eliminates the components located beyond the useful band of 515 – 2915 Hz. The signal obtained at the output of filter 63 is applied to the transmission channel.

In the receiver shown in FIG. 15 which is suitable to be combined with the transmitter of FIG. 10 ample use is made of the numerical filter according to the invention and especially for locking the receiver and for automatically equalizing the transmission channel.

The incoming signal received at input 100 is located in the frequency band of 515 – 2915 Hz when there is no frequency offset in the transmission channel.

Firstly, a plurality of successive operations is performed with the aid of the known circuits incorporated in a device 101. These operations are opposite to those which are performed in the last stages of the transmitter.

The received signal first passes through an analog lowpass filter 101 which results in a negligible attenuation for frequencies up to approximately 3200 Hz and a considerable attenuation for frequencies above 5000 Hz.

The signal is subsequently applied to an amplitude modulator 103 which is identical to modulator 61 of the transmitter in which modulation is performed with the aid of a square-wave carrier of 5485 Hz applied to an input 104 if there is no frequency offset of the signal during transmission. However, to take account of such a frequency offset, the frequency of the square-wave carrier in the receiver applied to input 104 may be varied with the aid of a device which will be described hereinafter.

The signal coming from modulator 103 is applied to a second very simple analog lowpass filter 105 which eliminates the modulation residues about the odd harmonics of the frequency of the square-wave carrier. Finally, the two sidebands of the signal about the carrier at 5485 Hz areoobtained at the output of filter 105, namely the band of 2570 – 4970 Hz and the band of 6000 – 8400 Hz.

The signal thus obtained is subsequently applied to an analog-to-digital converter 106 of the PCM type in which it is firstly sampled at a frequency of 19,200 Hz and the samples are subsequently coded in a system employing twelve binary elements. An analog-to-digital converter of this kind is described, for example, in the above-mentioned French Patent application No. 6,926,970 (PHN 4592).

A numerical filter 107 of the halfband type is programmed in order to eliminate the part of the signal located in the band of 0 – 4800 Hz; by deriving only every second sample at the output of the filter, the sampling frequency of 19,200 Hz is reduced to 9600 Hz and the useful signal is brough to the band of 1200 – 3600 Hz.

Hence a series of samples having a frequency of 9600 Hz is obtained at the output of filter 107; if there is no The signal coming from filter 107 is applied on the one hand through line 108 to different circuits for locking the receiver on the transmitter and on the other hand it is applied through line 109 to the automatic equalizer 110 of the transmission channel in which equalizer the amplitude distortions and the delay distortions are compensated for by networks whose amplitude characteristics and delay characteristics shown variations that are opposite to those of the transmission channel.

The equalized signal leaves the equalizer at output 111 and is applied to a circuit 112 where the pilot signals are eliminated. Subsequently, the incoming samples are compared in absolute value in a comparison circuit 113 with a fixed value which is half that of the maximum value of the data signal, and a 0 or a 1 is applied to the output of the comparison circuit dependent on whether the samples have an absolute value which is lower or higher than this half maximum value.

The series of binary elements thus formed which occurs in the rhythm of 9600 elements per second is applied to a demodulator circuit 114 performing only the following operation: of successive pairs of incoming binary elements only one pair of every two elements is maintained. In this manner the recovered data signal is obtained again at the output 115 of the receiver at a rate of 4800 bits/sec.

On the other hand an output 116 of equalizer 110 in the circuit diagram of the receiver according to FIG. 15 is connected to an input of a spectral line filter 117.

This spectral line filter 117 which is used for locking the receiver and for equalizing the transmission channel must be designed both for the joint selection during transmission of the three frequencies of the pilot signals and for the separate selection, prior to transmission, of the frequencies of the three pilot signals and the frequencies of the adaptation signal (which are spaced 300 Hz apart.) This spectral line filter must thus be controlled in accordance with a predetermined programm and a numerical filter according to the invention is very suitable for this purpose.

The spectral line filter 117 to which the samples are applied at a frequency of 9600 Hz must select spectral lines which are spaced 300 Hz apart. It has been designed for selecting partial bands having a bandwidth which is equal to $150 = 4800/2^5$ Hz; thus it includes five stages.

FIG. 16 shows the partial bands selected by the different stages. FIGS. 16 shows the partial bands selected by eight cells of the first stage in the band of 0 – 4800 Hz when the band-selection signal $S_1$ is 0 (solid-line curves) and when this control signal $S_1$ is 1 (broken-line curves).

Likewise FIGS. 13*b*, 13*c*, 13*d* and 13*e* show the partial bands selected by the cells of the 2nd, 3rd, 4th and 5th stages, respectively, when the band-selection signals $S_2$, $S_3$ and $S_4$ and $S_5$ are 0 (solid-line curves) and when these signals are 1 (broken-line curves).

The spectral line filter 117 is firstly used for locking the receiver. The clock signal used in the analog-to-digital converter 106 is produced by a time base circuit 118 which is controlled by a quartz oscillator 120 which has a variable frequency in the vicinity of 2457 kHz. At an output 119, the time base circuit 118 likewise produces the data clock frequency (4800 Hz) that attends the data signals. The receiver must be locked in frequency and phase to the transmitter; this locking is realized by using the information supplied by the pilot signals.

In order to realize the frequency control of the receiver the two extreme pilot signals of 1200 Hz and 3600 Hz are used whose frequency difference of 2400 Hz is accurately equal to half the frequency of the data clock signal at the transmitter end. The difference between the frequencies of these pilot signals at the receiver end is independent of the signal spectrum offset which may have occurred in the transmission channel.

This property is utilized so as to realize frequency control of the receiver. The spectral line filter 117 is programmed to successively select the two extreme pilot signals of 1200 Hz and 3600 Hz. The frequency of the two pilot signals is measured on a local basis with the aid of a counter 121 to which these two polot signals are applied, whereafter the difference between these frequencies is produced in a circuit 122 which difference is a measure, on a local basis of half the frequency of the data clock signal. The frequency of the oscillator 120 controlling the time base circuit 118 is corrected in a control circuit 123 in such a manner that the frequency difference between the pilot signals measured in the receiver is equal to half the frequency of the data clock signal which is provided by the transmitter.

In order to measure the frequency of the polot signal at 1200 Hz, for example, on a local basis, the number of half periods of this pilot signal is counted in counter 121 during a period which corresponds to 512 samples at a frequency in the vicinity of 9600 Hz and which is provided by the time base circuit 118. Thus a number $F_1$ is obtained which lies in the vicinity of 128. The measurement of the frequency of the pilot signal of 3600 Hz provides in the same manner a number $F_3$ in the vicinity of 384. The difference between the numbers $F_3 - F_1$ produced by the circuit 122 is a measure, on a local base, of half the frequency of the data clock signal. The value of this difference is 256 if the frequency of the local oscillator 120 is 512 times the frequency of the data clock signal at the transmitter end. If a value different from 256 is obtained, the frequency of oscillator 120 is corrected in such a manner that the value of 256 is obtained for $F_3 - F_1$.

The spectral line filter 117 is furthermore used in the initial phase of the operation of the phase control loop of the receiver. The part of the loop that is connected between the output of filter 107 and the control input 104 of modulator 103 comprises, as is known, a filter 124, a control circuit 125 which is connected to a programmable frequency divider 126 which divider controls the phase shift, at input 104, of the spectrum which is processed by modulator 103. This phase shift must be adjusted in order to take into account that the frequency offset that may have occurred in the transmission channel. The frequencies of the three pilot signals at 1200, 2400 and 3600 Hz must in fact have the ratios of 1 : 8, 2 : 8 and 3 : 8 to the sampling frequency of 9600 Hz, that is to say, the frequency of the central pilot signal must be in a ratio of 1 : 1024 to the frequency of the local oscillator; because the central pilot signal is used as a phase reference the phase of the sampling frequency is to be stabilized on that of the central pilot signal. The phase control loop normally operates as follows: The central pilot signal at 2400 Hz which is selected by filter 124 is applied to control circuit 125 distortion and no frequency offset at all in the transmission channel, the spectrum of this signal is the same as that of the signal supplied by filter 58 of the transmitter. During "full" speed transmission the spectrum corresponds to that shown in FIG. 13*g*.

which adjusts a dividend in the variable frequency divider 126 for the frequency of the local oscillator which dividend is initially adjusted at a value in the vicinity of 447 like in the transmitter. The filter 124 has a short time constant so as to make fast phase corrections possible. This may be a recursive numerical filter of the conventional type. It is alternatively possible that the frequency of the central pilot signal initially lies outside the passband of filter 124 and that consequently phase correction is impossible. In order to obviate this drawback the spectral line filter 117, which is connected to the frequency measuring circuit 121, makes it possible to perform a phase preadjustment.

To this end filter 117 is programmed for the frequency of the pilot signal of 2400 Hz. This frequency is measured with the aid of circuit 121 and must provide the number $F_2 = 256$ after the above-described adjustment of the frequency of oscillator 120 by the difference $F_3 - F_1$. If this is not the case an adjusting signal is applied through line 127 to control circuit 125. Subsequently, the fixed filter 124 selects the central pilot signal.

Control of the frequency of local oscillator 120 prior to transmission by means of measuring the frequency difference between the two pilot signals $F_1$ and $F_3$ is performed in a comparatively little accurate manner, namely with an approximation of 1/256.

Fine control of this frequency during transmission may be performed by using a numerical filter according to the invention for selecting, for example, the pilot signal of 1200 Hz. It is this filter 128 of FIG. 15 which is programmed in a fixed manner for the frequency of 1200 Hz. The frequency of oscillator 120 is modified with the aid of this frequency thus selected and this is effected by means of measuring circuit 122 and control circuit 123 constituted by a digital-to analog converter so that exactly 1024 periods of the local oscillator frequency occur within half a period of the pilot signal of 1200 Hz.

The spectral line filter 117 is used during transmission for eliminating the pilot signals from the transmitted signal with the aid of the subtractor circuit 112. In this circuit 112 the samples of the pilot signals are subtracted from the samples originating from equalizer 110. The samples of the pilot signals are provided through a line 129 by special line filter 117 which must then be programmed so as to simultaneously select the spectral lines at 1200 Hz, 2400 Hz, 3600 Hz and in addition it must be programmed, for the purpose of equalization, for selecting the spectral line of zero frequency.

An automatic equalization system for the transmission channel in the embodiment of the transmitter and the receiver considered so far will hereinafter be described in detail, the transmitter including generator circuits for the pilot signals and for the adaptation signal and the receiver including equalizer 110 to which spectral line filter 117 is connected.

The manner in which the transmitter is designed and the convenience with which the numerical filters according to the invention can be programmed, which filters can then be used in the receiver (especially the spectral line filter) make automatic equalization of the transmission channel possible in a novel manner so that an accurate permanently adjusted equalization during transmission can be obtained without the drawbacks of the known systems. In addition the equalizer according to the invention is provided with a supervisory device which provides an alarm signal when the distortions exceed given prescribed limits; this equalization system is very advantageous in the transmission system according to the invention because of the convenience with which the data signals can be transmitted at half speed.

The automatic equalization will now be considered, certain hypotheses generally accepted for the distortions caused by the transmission channels being made:

The phase distortion near the central frequency of the channel which is taken as a reference, is slight.

The group delay is substantially quadratic on either side of the central frequency.

The equalization process employed according to the invention comprises, as is known, three stages:

1. During a first stage preceding data transmission a coarse equalization is performed.
2. During a second stage likewise preceding data transmission a fine equalization is performed on the coarsely equalized signal.
3. During a third stage the equalization is adjusted during transmission.

In the known systems transversal filters having variable coefficients are used for these three stages for realizing the transfer function which is opposite to that of the transmission channel: see, for example, the article by Charles W. Niessen and Donald K. Willim — IEEE Transactions on Communication Technology, Vol. COM-18, No. 4, August 1970, pages 377 - 394.

For the first stage coefficients are allotted to the transversal filter used in the known systems, which coefficients initially have values equal to but opposite to those of the received samples. This system is rather complicated and has the particular drawback that, if the phase distortions are corrected, the amplitude distortions are considerably increased.

For this first stage the invention provides a simpler system which has the advantage of correcting the phase distortions at the accuracy required for the second stage without causing considerable amplitude distortions.

For the second equalizing stage the invention employs a transversal filter in accordance with the known processes.

For the third stage the invention employs a transversal filter which corrects the channel at frequencies of the pilot signals, but according to a novel procedure the correction at the pilot frequencies is interpolated for regularly distributed frequencies located between the pilot signal frequencies.

The second stage may be omitted in the equalizing system according the invention, dependent on the accuracy envisaged for the equalization.

According to the invention the transmitter tramsmits the adaptation signal for the two first equalizing stages preceding transmission, the spectrum of said adaptation signal being shown in FIG. 13*h* and consisting, as stated, of the series of samples:

----001 000------000 1 000-----000 1 000---000 1 00 ---

31 31 31

It may be noted that the three pilot signals of 1200 – 2400 – 3600 Hz are present in the received adaptation signal and that consequently locking of the receiver on the transmitter is performed in the manner described hereinbefore. Due to particularly the phase control loop which controls modulator 103, the phase of the samples, which are received in the rhythm of 9600 samples per second in equalizer 110, is accurately stabilised on the phase of the central pilot signal of of 2400 Hz which is used as a reference. FIG. 17 shows the correct phase stabilisation thus obtained. Solid lines represent the pilot signal of 2400 Hz. The sampling instants recurring in a rhythm of 9600 Hz are represented by arrows. For a correct phase stabilisation these occur exactly at the instants when the pilot signal at 2400 Hz has a maximum or minimum value or is zero.

To be able to use the received matching signal, that sample that had the value of 1 at the transmitter end under 32 successive samples must be recovered and distinguished in the receiver. In other words, in the receiver a rhythm of 300 Hz must be obtained in synchronism with the transmitted rhythm of 300 Hz. It may be noted that the sample wanted is one of those samples for which the pilot signal of 2400 Hz has its maximum value: this event may occur eight times per 32 successive samples.

To eliminate this doubt not only the samples of the signals of 2400 Hz which have a maximum value, but alos the samples of the signals of 2100 Hz and 2700 Hz are investigated which samples have spectral lines located near the central spectral line of 2400 Hz and which have thus undergone a very slight phase distortion in the transmission channel. This investigation is carried out with the aid of spectral line filter 117 which is successively programmed for the frequencies of 2400 Hz–2100 Hz–2700 Hz. The sample wanted is the one for which the signal of 2400 Hz has the maximum value and for which the signals of 2100 Hz and 2700 Hz likewise have the maximum value. This is shown in FIG. 17 which represents the three sinusoudal signals of frequencies 2100, 2400 and 2700 Hz in the case where the phase distortion caused by the transmission channel is zero. Of the 32 successive samples of 9600 Hz occurring from the instant $t_o$ to the instant $t_{31}$, the sample occurring at instant $t_o$ is wanted because this is the only sample for which the signals of frequencies 2100, 2400 and 2700 Hz simultaneously have the maximum value. If the signals of frequencies 2100 and 2700 Hz have undergone a slight phase distortion, their value at the instant $t_o$ is weaker than that of the signal of 2400 Hz, but this value remains higher than that at the other instants such as $t_4$ when the signal of 2400 Hz has a maximum amplitude too. Determination of the sample wanted is possible if the phase distortion at 2100 Hz and 2700 Hz is less than $\pi/8$.

FIG. 19 shows a block diagram of equalizer 110 of FIG. 15. The spectral line filter 117 which is already shown in FIG. 15 is once more shown in FIG. 18.

The input of the equalizer is constituted by terminal 130 to which the samples are applied in a rhythm of 9600 Hz, which samples originate from the adaptation signal during the two first stages and which, during transmission, originate from the data signal together with the three pilot signals at 1200, 2400 and 3600 Hz. The input 130 is followed by a filter 131 which eliminates the spurious signals outside the useful frequency band of 1200 – 3600 Hz.

In order to obtain synchronization of the rhythm of 300 Hz of the receiver tp that of the transmitter in accordance with the process just described, the output signal from filter 131 is applied through a switch 132 to spectral line filter 117. This filter is programmed for 2400 Hz and then for 2100 Hz and 2700 Hz. The signals of these frequencies are applied to a circuit 133 in which, dependent on the mutual values of these signals, the control signals are generated for the phase shift of the local rhythm of 300 Hz provided by a circuit 134; the value of the successive phase shifts is 1/2400 sec.

The process will now be described which is used for the correction of the delay distortion of the transmission channel during the first equalizing stage. This first stage supposes that synchronization of the local rhythm of 300 Hz is performed which means that, as has just been apparent, the phase distortion is less than $\pi/8$ at the frequencies of 2100 and 2700 Hz. This synchronization makes it possible to retrace the samples in series of 32 successively received samples for which all signals of frequencies at a multiple of 300 Hz are in phase at the transmitter end. In the receiver the measurement of the value of these different signals at the instant when this sample occurs (instant $t_o$ in FIG. 17) makes it possible to obtain a measure of the distortion of the transmission channel in order to be able to correct this distortion.

During the first equalizing stage according to the invention a coarse correction is performed by inserting suitable correction cells in the signal path; the distortion measurements are performed on the one hand for the frequencies of 3000, 3300 and 3600 Hz in that order, which frequencies are higher than 2400 Hz, and on the other hand for the frequencies of 1800, 1500 and 1200 Hz in that order, which frequencies are lower than 2400 Hz. The suitable corrections are performed for both frequency ranges in the same order.

FIG. 19*a* shows detailed block diagram of an embodiment of the arrangement used for coarse correction of the distortion and which is shown at 135 in FIG. 18.

The samples of the adaptation signal enter an input 150 and are applied to two parallel channels which are denoted by hand $b$. Each channel includes cascade-arranged circuits of the same type which are denoted by $h_1, h_2 \ldots h_n$ and $b_1, b_2 \ldots b_n$, respectively. Each circuit $h_1 - h_n$ en $b_1 - b_n$ includes a switch $S_h$ or $S_b$, a phase shifting cell $C_h$ or $C_s$ for equalization and a cell $v_h$ or $v_b$ which causes a constant delay without phase shift. The channel $h$ furthermore includes a highpass filter $F_h$ and the channel $b$ includes a lowpass filter $F_b$. The samples from filters $F_h$ and $F_b$ are added in an adder 151 whose output provides coarsely equalized samples.

A phase-shifting cell may consist of, for example, a simple non-recursive filter which has only a few coefficients, the corresponding coefficients on either side of the central coefficient being equal in magnitude but being opposite in sign. A delay cell may likewise be a simple non-recursive filter in which only the central coefficient differs from zero.

FIG. 19*a* likewise shows the spectral line filter 117 of the receiver connected in a position so as to be used for the first equalization stage. Dependent on the position of a switch 152, this filter 117 may be connected to the output of circuit $h_n$ of channel $h$ or to the output of circuit $b_n$ of channel $b$. A control circuit 153 makes it possible to control the switches $s_h$ and $s_b$ of each of the circuits $h_1 - h_n$ and $b_1 - b_n$.

The arrangement according to FIG. 19*a* operates in the following manner: all switches $s_h$ and $s_b$ are initially in the position in which the delay cells $v_h$ and $v_b$ are operative and in which each phase correction cell $C_h$ and $C_b$ is inoperative.

The spectral line filter 117 is successively programmed for the three spectral lines which are lower than 2400 Hz. Firstly, it is programmed for 1800 Hz. In the control circuit 153 the sign of the sample coming from filter 117 is checked at the previously adjusted sampling instant $t_o$. When the sign of the sample is positive, the phase shift as a result of the distortion is less than $\pi/2$. When the sign of the sample is negative, the phase shift as a result of the distortion is more than $\pi/2$. This is shown in FIG. 19*b* in which signals of 1800 Hz and 2400 Hz are shown near the instant $t_o$. The signal of 1800 Hz, which is shown in a solid line, has not undergone any phase distortion. Sampling it at the sinstant $t_o$ provides a maximum positive value. The signal of 1800 Hz which is shown in a broken line has undergone a distortion which is more than $\pi/2$. It is evident that sampling it at the instant $t_o$ results in a negative value.

In the case where the sample has a positive value, which involves a phase shift of less than $\pi/2$ at 1800 Hz, the spectral line filter is automatically programmed for the spectral line at 1500 Hz.

In the case where the sample has a negative value, which involves a phase shift of more than $\pi/2$ at 1800 Hz, the control circuit 153 successively operates the switches $s_b$ so as to render the phase correction cells $C_b$ operative in such a manner that the sample of the spectral line at 1800 Hz assumes a positive value at the instant $t_o$. At that instant the spectral line filter is programmed for the spectral line at 1500 Hz where the same operations are carried out for checking the sign of the samples and for controlling the switches $s_b$. Finally the filter is programmed for the spectral line at 1200 Hz and again the same operations are carried out. At the end of this first series of operations the phase shift at frequencies of less than 2400 Hz is thus reduced to a value which is less than $\pi/2$ by rendering fixed cells of channel $b$ operative. The filter $F_b$ is a numerical filter according to the invention and is of the lowpass type having a cut-off frequency of 2400 Hz at which frequency an attenuation of 6 dB occurs. It provides the possibility of applying equalized samples in the band of frequencies of less than 2400 Hz to adder circuit 151.

The arrangement operates in the same manner for correcting the phase distortion for the band of frequencies of more than 2400 Hz. The spectral line filter 117 is successively programmed for the frequencies of 3000 Hz, 3300 Hz and 3600 Hz and for each frequency the control circuit 153 renders the phase correction cells $C_h$ of channel $h$ operative in accordance with the same criterion as for the lower band. The phase shift is thus reduced in the same manner to a value of less than $\pi/2$ for this upper band. The filter $F_h$ is a numerical filter according to the invention of the highpass type whose cut-off frequency is 2400 Hz and whose attenuation is 6 dB at this frequency. The outgoing samples of filter $F_h$ are added in adder circuit 151 to the outgoing samples of filter $F_b$. Due to the presence of the filters $F_b$ and $F_h$ the equalizer of FIG. 19*a* renders a strictly independent correction possible of the lower half-band of the transmission channel and of the upper halfband. This is an important advantage because the phase distortion characteristic of the transmission channel usually is not symmetrical relative to the central frequency.

It may likewise be noted that the numerical filters $F_b$ and $F_h$ have accurately complementary characteristics and that the attenuation at the central frequency of 2400 Hz for the two filters is accurately 6 dB; the arrangement according to FIG. 19*a* consequently does not disturb the signal at 2400 Hz and at frequencies located in its vicinity. Particularly the reference pilot signal at 2400 Hz is not disturbed.

In the block diagram of the equalizer according to FIG. 18 the block 135 denotes the assembly of cells for coarse correction. The output of this coarse equalizer 135 is shown diagrammatically, which equalizer is connected through the switch 132 to spectral line filter 117 with the aid of which the control circuit 153 can activate the correction cells.

During the second equalization stage, which precedes the data transmission, a correction of the distortion is brought about which goes further than that which is realized by the arrangement for coarse correction. This correction is obtained with the aid of transversal filter 136 having variable coefficients as shown in FIG. 18.

For the coarse correction the 300 Hz spaced spectral lines are used which are located in the band of from 1200 to 3600 Hz.

For the fine correction it is necessary that the spectrum of the signal which is applied to the transversal filter 136 also includes 300 Hz spaced spectral lines which are lower than 1200 Hz and higher than 3600 Hz. For the re-introduction of these spectral lines which are not present in the received adaptation signal the equalizer of FIG. 18 includes a circuit 137 which transmits a periodical series of samples in the form if a 1 followed by 31 0. This circuit 137 is exactly equal to the circuit 57 of the transmitter and the spectrum of the signal transmitted thereby consists of spectral lines having equal amplitudes at the frequencies of 0 and 300 Hz and at multiples thereof. The signal is applied through a switch 138 to a numerical filter 139 and is filtered therein in accordance with the transfer function shown in FIG. 20 which is exactly the opposite function of that of filter 58 in the transmitter. With the aid of an adder circuit 140 the samples which are provided by filter 139 are superimposed on the received signal which is equalized by the coarse equalizer 135.

FIG. 21 shows an example of the spectrum of the signal which is thus applied to the input of transversal filter 136 used for fine equalization.

The spectral lines shown by the arrows are oblique when they have undergone a phase distortion and are vertical in the opposite case.

Of course only the transmitted spectral lines in the bandwidth of 1200–3600 Hz have been subjected to phase distortion. The phase distortion is maximum at the ends of this band but in any case it is less than $\pi/2$. The distortion is equal to zero for the frequency of 2400 Hz in the centre of the transmission channel.

The samples applied in the input of transversal filter 136 are periodical: every time after 32 samples they have the same values, hence they occur in the rhythm of a frequency of 300 Hz. For a total of 32 successive samples one of these samples has a maximum value; it is the centrally located sample having a value of $S_o$ which occurs at the instant $t_o$.

The 16 samples by which the sample $S_o$ is preceded and followed have values which are indicated by $S_{-16}$, $S_{-15}$, . . . $S_1$ and $S_{-1}$ . . . $S_{15}$, $S_{16}$, respectively. The central sample $S_o$ is accurately in phase with the synchronized 300 Hz signal which is obtained with the aid of the central pilot signal at 2400 Hz.

The transversal filter 136 is a non-recursive filter having variable coefficients and it may be of the type described in the above-mentioned French Patent application No. 6,926,970 (PHN. 4592). In this case, however, it should be taken into account that the coefficients of the filter can be varied.

FIG. 22 shows in this case the block diagram of transversal filter 136. It includes registers in the form of circulating memories for storing the 33 filter coefficients, which registers are denoted by $a_{-16}$, $a_{-15}$, . . . $a_{-1}$, $a_o$, $a_1$, . . . $a_{15}$, $a_{16}$.

In order to modify these coefficients the registers are preceded by adders to which modification values $\Delta a_{16}$, . . . $\Delta a_1$, $\Delta a_o$, $\Delta a_1$. . . $\Delta a_{16}$ are applied. These values are provided by a memory 141 which is shown in in FIG. 18.

The transversal filter likewise includes 33 registers $R_{-16}$, . . . $R_{-1}$, $R_o$, $R_1$ . . . $R_{16}$ each preceeded by an adder while the registers also serve as accumulators for the multiplication. The samples of the incoming signal are stored during multiplication in a register in the form of memory R. The binary elements of the coefficients $a_{-16} - a_{16}$ admit or do not admit the sample to the accmulator owing to AND-gates $P_{-16} - P_{16}$.

An iteration process makes it possible to modify the coefficients of the transversal filter in such a manner that the transfer function thereof is the function of that of the transmission medium approximated with a previously determined accuracy dependent on the number of iterations. This known process is described in the above-mentioned article by Niessen and Willim.

In the relevant case this process is the following:

For the first iteration all coefficients of the filters stored in the registers are firstly fixed at zero, with the exception of the coefficient $a_o$ which is fixed at 1. Under these circumstances the transversal filter 136 deals with the received adaptation signal which is completed in adder circuit 140. Thirty-three samples coming from the filter and centred about the central sample $S_o$ have, for example, the amplitudes shown in FIG. 23*a*. The variation of the adaptation signal transmitted is shown in FIG. 23*b* in which all samples have a value of 0, with the exception of the central sample which has the value of 1. On the other hand the adaptation signal, which is treated by the transversal filter and is shown in FIG. 23*a*, includes samples having values which are not equal to 0 while the central sample $S_o$ has a value of less than 1. The differences between the two series of samples of FIG. 23*a* and 23*b* are the result of distortions caused by the transmission channel and by the parts of the transmitter and the receiver through which the adaptation signal passes. With the aid of a subtractor circuit 142 the series of samples from transversal filter 136 is subtracted from the series of samples of 300 Hz, which latter series is provided by generator 134 for the local adaptation signal.

The series of 33 samples obtained after this subtraction is shown in FIG. 23*c*. This series is stored in a coefficient modification memory 141. Subsequently these samples are added to the filter coefficients which are stored in the memories $a_{-16} - a_{16}$.

A second iteration is performed in the same manner with these new coefficients. After a given number of iterations of this kind the transfer function of transversal filter 136 tends to the inverse value of the transfer function of the circuits through which the transmitted adaptation passes.

This fine equalization process with the aid of a transversal filter, which is gradually adjusted during a given number of iterations, is known per se. During equalization a very great accuracy can be obtained, but it has the drawback of being slow in the case where the distortion to be corrected is considerable, because in that case a large number of iterations is required for obtaining great accuracy during equalization. It cannot even operate in the distortions are very large.

However, due to the simultaneous use of the arrangement 135 for coarse equalization, which very quickly reduces the phase distortion to a value of less than $\pi/2$ at the upper and lower ends of the transmission channel without introducing amplitude distortion, the correction range for fine equalization becomes larger on the one hand on the other hand the same accuracy is obtained more quickly during equalization.

After fine equalization thus obtained with the aid of the adaptation signal, the data transmission is initiated. In order to realize a permanent adjustment of the qualization during transmission (the third equalization stage) the invention employs in a novel manner the three pilot signals at 1200, 2400 and 3600 Hz which signals are superimposed on the data signal at the transmitter end.

Transversal filter 136 is also used for this permanent equalization adjustment but the coefficients thereof are modified in accordance with criteria other than those for fine equalization.

As is shown in FIG. 13*g* the three pilot signals are transmitted at the transmitter end at a relative amplitude of 1 for 2400 Hz, of ½ for 1200 Hz and of ½ for 3600 Hz.

In the receiver the spectrum of the signal applied to transversal filter 136 must not only include the spectral lines of the three received pilot signals for the purpose of adjusting the equalization, but it must also include the spectral lines at the frequency of 0 and at the other multiples of 1200 Hz.

Such a signal at the input of transversal filter 136 is obtained in a manner which is analogous to that which is used for the adaptation signal during the fine equalization stage.

A circuit 143 in the receiver transmits a series of samples which is constituted by the same series:

— 001 0000000 1 0000000 1 0000000 1 00 ——— as that transmitted by circuit 53 in the transmitter.

The spectrum of this signal (see FIG. 24*a*) consists of spectral lines having equal amplitudes at the frequencies 0, 1200, 2400, 3600, 4800 Gz, etc. This series is applied through switch 138 to the numerical lowpass filter 139 whose transfer function is shown in FIG. 20. The samples at the output of this filter have the spectrum shown in FIG. 24*b*. They are combined with the transmitted sample in adder circuit 140.

For this third equalization stage the spectral line filter 117 is connected to the output of transversal filter 136 with the aid of switch 132. The filter is programmed in such a manner that it provides a signal which is the sum of the spectral lines at the frequencies 0, 1200, 2400, 3600 and 4800 Hz. At the output of spectral line filter 117 a signal is obtained, which in case of perfect equalization has a composed of spectral lines of equal amplitude at these frequencies; it is substantially the spectrum shown in FIG. 24*a*.

In this case of perfect equalization, 9 successive samples $S_{-4} \ldots S_{-1}, S_0, S_1 \ldots S_4$ provided by filter 117 have values which are equal to zero, with the exception of the central sample $S_o$ which has the value of 1.

FIG. 25*a* shows this series of samples. The term unit-pilot signal denotes the signal which corresponds to this series.

If on the other hand the transfer function of the transmission channel slightly varies during transmission, the previous samples will assume the values $(\Sigma_{-4}) \ldots (\Sigma_{-1}), (1 - \Sigma_o), (\Sigma_1) \ldots (\Sigma_4)$; this is shown in FIg. 25*b*. The residual values $\Sigma$ characterize the magnitude of the distortion to be corrected.

It would be possible to follow the same known iteration process for performing the correction as the process which is used for fine equalization. In this case transversal filter 136 would only be used partly. During this process only nine coefficients would be modified, that is to say, the four coefficients $a_{-4} \ldots a_{-1}, a_o, a_1 \ldots a_4$ since the central sample for the pilot signal occurs only once per nine successive samples. If this procedure were used, the distortion at the frequencies 1200–2400–3600 Hz would be equal to zero, but the distortion at the intermediate frequencies might be larger than that before correction.

The invention provides a novel process by which these drawbacks are obviated and which more completely utilizes the features fine equalization transversal filter 136.

According to this process an interpolation of the correction at the frequencies of the pilot signals was made at frequencies which are a multiple of 300Hz and which are located between the pilot signals. According to this new procedure, thirty-three coefficients, $a_{-16} \ldots a_{-1}, a_0, a_1 \ldots a_{16}$, of transverse filter 156 are modified in the following manner.

The signal output from the line filter 117 is subtracted from the unity signal from circuit 143 in subtractor circuit 144 which is coupled to line equalization filter 136. The output signal of subtractor circuit 144 is the following residual values, $-(\Sigma_{-4}) \ldots -(\Sigma_{-1}), -(\Sigma_0), \ldots (\Sigma_4)$. These values, which are stored in memory 141, are shown in FIG. 25*c* and are the difference between the signals shown in FIGS. 25*a* and 25*b*. Then, the preceeding residual values stored in memory 141 are added to the nine central coefficients of filter 136, that is, $a_{-4}, \ldots a_{-1}, a_0, a_1, \ldots a_4$, with the exception of the values of $\Sigma_{-4}$ and $\Sigma_4$ to which only half is added because these correspond to the same sample. Consequently, after this first phase, the modified coefficient of the filter have the values:

$[a_{-4} - (\Sigma_{-4})/2,]$ $[a_{-3} - (\Sigma_{-3})]$, $[a_{-2} - (\Sigma_{-2})]$, $[a_{-1} - (\Sigma_{-1})]$, $[a_1 - (\Sigma_1)]$, $[a_2 - (\Sigma_2)]$, $[a_3 - (\Sigma_3)]$, $[a_{4/2} - (\Sigma_4)]$ Likewise the two groups of four coefficients which are located on either side of the nine central coefficients are modified by adding to these coefficients a considerable previously determined fraction of the preceding residual values, which fraction is, for example, ¾. In this case the new coefficients are then obtained:

$[a_{-8} - (\Sigma_{-4/2}) \times ¾]$, $[a_{-7} - (\Sigma_{-3}) \times ¾]$, $[a_{-6} - (\Sigma_{-2}) \times ¾]$ $[a_{-5} - (\Sigma_{-1}) \times ¾]$ $[a_5 - (\Sigma_1) \times ¾]$, $[a_6 - (\Sigma_2) \times ¾]$, $[a_7 - (\Sigma_3) \times ¾]$, $[a_8 - (\Sigma_{4/2}) \times ¾]$ Likewise the two groups of four coefficients which are located on either side of the seventeen central coefficients already corrected are modified by adding in the same manner to these coefficients a previously determined but smaller fraction of the preceding residual values, for example, half of the residual values obtained with the aid of subtractor circuit 144.

Finally the two extreme groups of four coefficients are modified by using in the same manner a previously determined but still smaller fraction, for example, a quarter of the residual values.

The fractions with the aid of which all coefficients of the transversal filter are modified, starting from the accurate corrections for the frequencies of the pilot signals, can be determined in advance in a comparatively precise manner, for it is known that the group delay distortions on either side of the central frequency generally exhibit a parabolic variation.

Thus it is possible to interpolate the accurate corrections at the frequencies of the pilot signals for the intermediate frequencies which are multiples of 300 Hz in accordance with a predetermined rule.

The equalizer shown in FIG. 18 includes an arrangement 145 for checking and supervising the equalization process during the three stages. This checking arrangement 145 applies an alarm signal to an alarm circuit 146 in the three following cases which correspond to each equalization stage:

*a*. during coarse equalization, when the phase shift for one of the spectral lines selected by spectral line filter 117 remains larger than $\pi/2$ in spite of rendering all fixed correction cells of the arrangement operative for coarse equalization.

*b*. At the end of the fine equalization, when one of the residual values of the equalized adaptation signal, which residual values are provided by subtractor circuit 142 exceeds a predetermined value, which indicates that the distortion of the equalized adaptation signal exceeds predetermined value.

*c*. During the transmission when in the same manner one of the residual values of the equalized pilot signals, which residual values are provided by subtractor circuit 144, exceeds a predetermined value which likewise indicates that the distortions of the equalized pilot signals exceed a predetermined value.

In all these cases which are signalized by an alarm signal it is possible to cause the transmission system to operate at "half" speed in a simple manner, the data signals then being transmitted at 2400 bits/sec instead of at 4800 bits/sec.

The useful frequency bandwidth which is to be corrected by the equalizer is then reduced to the band of 1800–3000 Hz and there is a great probability that the equalization is then accurate.

The change-over of the system to half the maximum speed can be very simply and automatically performed with the transmission system according to the invention.

In the transmitter shown in FIG. 10 the circuit 54 is described which renders the transmission of spectral lines at the frequency 0 and at multiples of 600 Hz possible if the transmission system operates at "half" speed (2400 bits/sec.). The spectrum of the transmitted signal after filtering in filter 58 of the transmitter has the shape shown in FIG. 13*a*. This Figure shows that this spectrum in the useful band of from 1800–3000 Hz includes pilot signals at frequencies of 1800 Hz, 2400 Hz and 3000 Hz.

In order to match input filter 131 of the equalizer to this useful band this filter is now programmed in such a manner that only the useful band of 1800–3000 Hz is selected in the receiver. Likewise, filter 139 is programmed in such a manner that the spectrum of the signal applied to the input of equalizing filter 136 not only includes the received signals but also the components of the adaptation signal or of the pilot signal located outside the useful band of from 1800 to 3000 Hz.

For the first equalization stage operation at half speed is the same as at full speed, except that the part of the spectrum of the received signal used by the spectral line filter is restricted to the band of from 1800 to 3000 Hz.

For the second equalization stage the operation does not change.

For the third equalization stage the spectral line filter in case of operation at half speed is only to be programmed in order to select the set of new pilot signals.

What is claimed is:

1. A digital filter to the input of which the samples of an analog signal are applied, the spectrum of said analog signal being restricted to a frequency of $f_m$ which is half the sampling frequency, the filter comprising:

$2^{n-1}$ elementary halfband pass filter cells of the same type which are grounded in $n$ cascade-arranged stages, the first stage including $2^{n-1}$ cells, the $p^{th}$ stage including $2^{n-p}$ cells, $p$ indicating the number of any stage and varying between 1 and $n$ from the first to the last stage, the last stage including one cell the output of which is the output of the filter;

means for splitting up the incoming series of samples of frequency $2f_m$ into $2^{n-1}$ interlaced series of the frequency $2f_m/2^{n-1}$ which are separately applied to the cells of the first stage;

means inserted between succeeding stages, the $p^{th}$ stage and the $(p+1)^{th}$ stage, for combining pairwise the $2^{n-p}$ outgoing series of the $p^{th}$ stage in order to constitute $2^{n-(p+1)}$ interlaced series of regularly distributed samples of frequency $2f_m/2^{n-(p+1)}$ which are applied to the $2^{n-(p+1)}$ cells of the $(p+1)^{th}$ stage;

means for supplying the cells with clock signals the frequency and the phase of which are in correspondence with the frequency and the phase of the samples applied thereto;

means at the input and at the output of each cell for reversing the sign of one out of every two incoming and outgoing samples;

means in each cell for inhibiting its filter function;

a terminal at each stage for controlling the sign reversal of all cells of the stage and a terminal at each stage for controlling the inhibition of all cells of the stage, the filter passband being variable in width and position in steps having a band width of $f_m / 2^n$ dependent on the value of the binary number with $n$ bits applied to the $n$ terminals for controlling the reversal and of the binary number with $n$ bits applied to the $n$ ternimals for controlling the inhibition state.

2. A numerical filter as claimed in claim 1, characterized in that the elementary cell has two inputs, a even input to which the even samples are applied and a odd input to which the odd samples are applied, said two inputs being connected to two half-bandpass filters of the non-recursive type having the same transfer function, one filter treating the even samples and the other filter treating the odd samples, said two series of filtered samples being regrouped to a single outgoing single series of the cell, each of the $2^{n-1}$ series of samples applied to the cells of the first stage being split up into a series of even samples and a series of odd samples which are applied to the even input and the odd input, respectively, of the said cell of the first stage, while the outputs of the two cells of each stage providing the regularly distributed samples are connected to the even input and the odd input, respectively, of a cell of the next stage, the means with which each cell is provided on the one hand for reversing the sign of every second incoming and outgoing sample and on the other hand for inhibiting its filter function consisting of a logical circuit which on the one hand renders it possible to simultaneously reverse the sign of the even samples applied to the even filter and the sign of the odd samples applied to the odd filter, and which on the other hand renders it possible to block the even samples applied to the even filter and to block the odd samples applied to the odd filter.

* * * * *

UNITED STATES PATENT AND TRADEMARK OFFICE

CERTIFICATE OF CORRECTION

PATENT NO. : 3,801,913

DATED : April 2, 1974

INVENTOR(S) : JACQUES LUCIEN DAGUET and MAURICE GEORGES BELLAN(

It is certified that error appears in the above-identified patent and that said Letters Patent are hereby corrected as shown below:

IN THE TITLE

"NUMERICAL" should be --DIGITAL--;

IN THE SPECIFICATION

Col. 2, line 18, "numerical" should be --digital--;

line 31, "than" should be --that--;

line 42, "fil-ter" should be --filter--;

Col. 6, line 19, "borken" should be --broken--;

Col. 7, line 42, "$0 = f_m$" should be --$0 - f_m$--;

Cols. 17 and 18, lines 61 through 64, group all numbers under Col. 18;

Col. 19, line 7, "111111111" should be --1111111111--;

UNITED STATES PATENT AND TRADEMARK OFFICE

CERTIFICATE OF CORRECTION

PATENT NO. : 3,801,913

DATED : April 2, 1974

INVENTOR(S) : JACQUES LUCIEN DAGUET and MAURICE GEORGES BELLANGEI

It is certified that error appears in the above-identified patent and that said Letters Patent are hereby corrected as shown below:

Col. 20, line 69, after "if there is no" insert --distortion no frequency offset at all in the transmission channel, the spectrum of this signal i the same as that of the signal supplied by filter 58 of the transmitter. During "full speed transmission the spectrum corresponds to that shown in Figure 13g.--;

Col. 21, line 8, cancel "shown" and insert --show--;

Col. 22, line 17, "polot" should be --pilot--;

line 28, "polot" should be --pilot--;

Col. 23, lines 1 through 5, cancel in their entirety;

Col. 24, line 63, "tramsmits" should be --transmits--;

Col. 25, line 33, "alos" should be --also--;

Col. 28, line 45, "if" should be --of--;

Col. 31, line 18, "FIg." should be --Fig.--.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*